United States Patent
Fujioka

(10) Patent No.: US 9,128,557 B2
(45) Date of Patent: Sep. 8, 2015

(54) DISPLAY DEVICE INCLUDING A DISPLAY REGION WHERE A TOUCH SENSOR IS PROVIDED

(75) Inventor: Kazuyoshi Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 360 days.

(21) Appl. No.: 13/391,657

(22) PCT Filed: Apr. 27, 2010

(86) PCT No.: PCT/JP2010/003008
§ 371 (c)(1),
(2), (4) Date: Feb. 22, 2012

(87) PCT Pub. No.: WO2011/024349
PCT Pub. Date: Mar. 3, 2011

(65) Prior Publication Data
US 2012/0147287 A1 Jun. 14, 2012

(30) Foreign Application Priority Data
Aug. 27, 2009 (JP) .................................. 2009-197282

(51) Int. Cl.
G06F 3/041 (2006.01)
G02F 1/1333 (2006.01)
(Continued)

(52) U.S. Cl.
CPC .......... *G06F 3/0412* (2013.01); *G02F 1/13338* (2013.01); *G06F 3/044* (2013.01); *G06F 3/0414* (2013.01); *G02F 1/13394* (2013.01)

(58) Field of Classification Search
CPC .... G06F 3/0488; G06F 3/04883; G06F 3/044
USPC ............................................. 345/173; 349/43
See application file for complete search history.

(56) References Cited

U.S. PATENT DOCUMENTS

| | | | | |
|---|---|---|---|---|
| 2001/0026251 | A1* | 10/2001 | Hunter et al. | 345/55 |
| 2005/0224698 | A1* | 10/2005 | Uehara | 250/214 R |
| 2006/0017710 | A1* | 1/2006 | Lee et al. | 345/173 |

(Continued)

FOREIGN PATENT DOCUMENTS

| | | |
|---|---|---|
| JP | 2001-042296 A | 2/2001 |
| JP | 2006-133788 A | 5/2006 |

(Continued)

OTHER PUBLICATIONS

Official Communication issued in International Patent Application No. PCT/JP2010/003008, mailed on Jul. 13, 2010.

(Continued)

*Primary Examiner* — Johnathan Blancha
(74) *Attorney, Agent, or Firm* — Keating & Bennett, LLP

(57) ABSTRACT

A first electrode (62c) is provided on a first substrate (2) having a display surface of a display panel, and connected to a common electrode (com). A field effect transistor (62b) is provided on a second substrate (1) in such a manner that the first electrode (62c) is provided in a back channel side of the field effect transistor (62b) so as to be separated from the field effect transistor (62b). The field effect transistor (62b) has a gate terminal and a first drain/source terminal each of which is connected to a first wiring (Vrstn) to which a voltage for reset is to be applied. A switch (62a) has a terminal connected to a second drain/source terminal (62bs), and the other terminal connected to a second wiring (Vom) from which an output of the field effect transistor (62b) is provided.

12 Claims, 17 Drawing Sheets

(51) Int. Cl.
*G06F 3/044* (2006.01)
*G02F 1/1339* (2006.01)

(56) References Cited

U.S. PATENT DOCUMENTS

| | | |
|---|---|---|
| 2006/0097975 A1 | 5/2006 | Lee et al. |
| 2006/0109222 A1 | 5/2006 | Lee et al. |
| 2007/0182723 A1* | 8/2007 | Imai et al. .................... 345/175 |
| 2008/0048995 A1* | 2/2008 | Abileah et al. ............... 345/173 |
| 2008/0122792 A1* | 5/2008 | Izadi et al. ................... 345/173 |
| 2009/0141004 A1 | 6/2009 | Yamazaki |
| 2009/0160822 A1 | 6/2009 | Eguchi et al. |

FOREIGN PATENT DOCUMENTS

| | | |
|---|---|---|
| JP | 2009-151138 A | 7/2009 |
| JP | 2009-157367 A | 7/2009 |
| WO | 2010/137215 A1 | 12/2010 |

OTHER PUBLICATIONS

Fujioka et al.; "Display Device"; U.S. Appl No. 13/322,138, filed Nov. 28, 2011.

* cited by examiner

F I G. 4
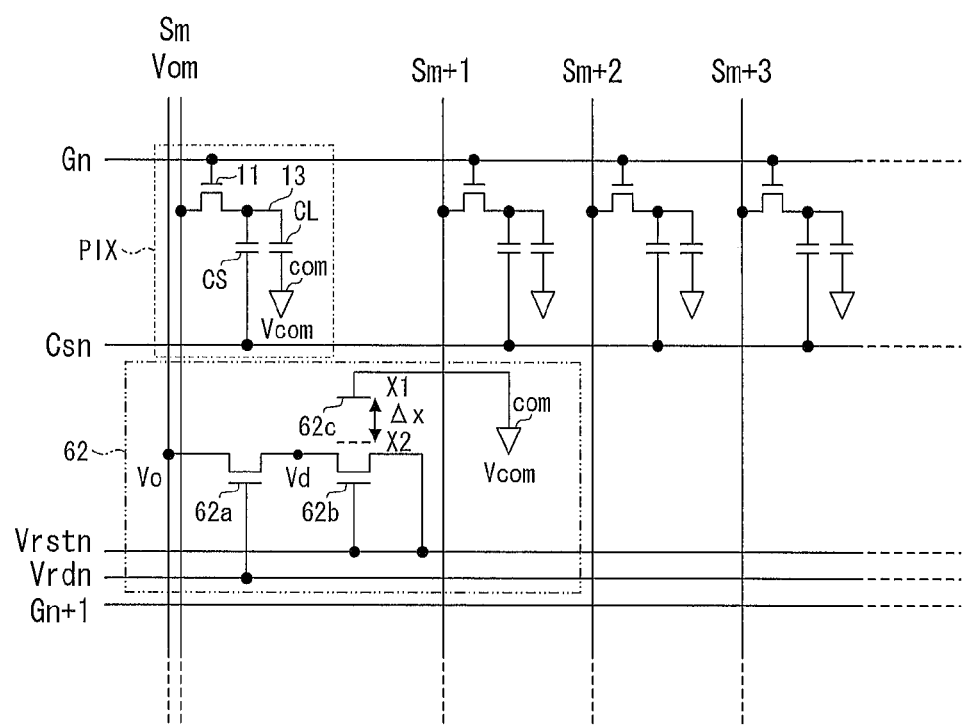

F I G. 5
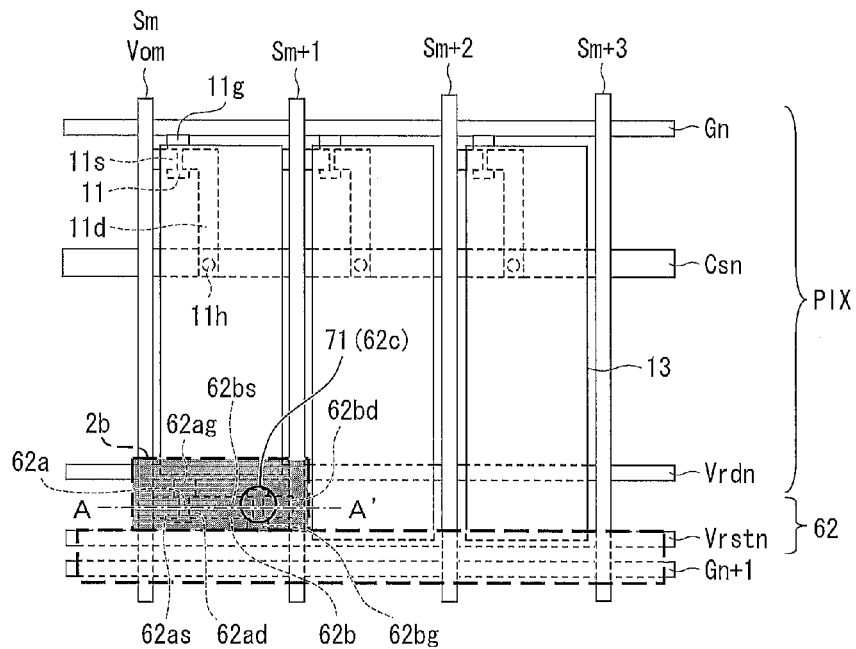

F I G. 1 6
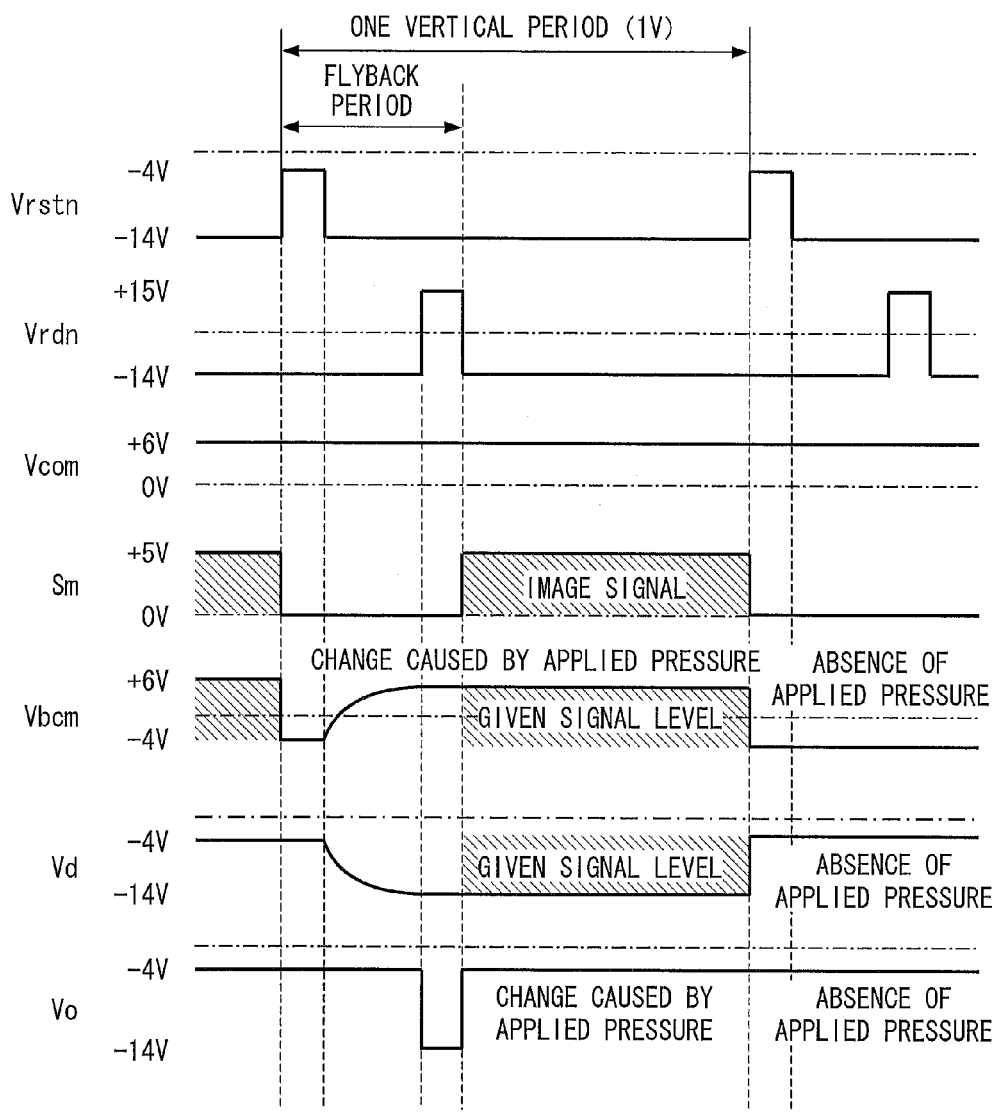

DISPLAY DEVICE INCLUDING A DISPLAY REGION WHERE A TOUCH SENSOR IS PROVIDED

TECHNICAL FIELD

The present invention relates to a display device including a display region where a touch sensor is provided.

BACKGROUND ART

There has known a liquid crystal display device including picture elements and pixels where touch sensors are provided. The touch sensors of such a liquid crystal display device employ, as a sensing type, an optical sensor type, a contact point (contact) type, or a capacitance type. The three sensing types have been put into practical use.

FIG. 21 shows a configuration of a display region where an optical sensor type touch sensor is provided.

FIG. 21 specifically shows a configuration of the n-th line of a display region of a liquid crystal display panel. In the n-th line are provided (i) a plurality of picture elements PIX defined by a gate wiring Gn, source wirings S (Sm through Sm+3 of FIG. 21), and a retention capacitor wiring Csn, and (ii) at least one sensor circuit (optical sensor circuit) 102 connected to a reset wiring Vrstn and a readout control wiring Vrdn.

Each of the plurality of picture elements PIX includes a TFT 101 serving as a selection element, a liquid crystal capacitor CL, and a retention capacitor CS. The TFT 101 has a gate connected to the gate wiring Gn, a source connected to corresponding one of the source wirings S, and a drain connected to a picture element electrode 103. The liquid crystal capacitor CL is a capacitor formed by the picture element electrode 103 and a common electrode com having a liquid crystal layer therebetween. The retention capacitor CS is a capacitor formed by the picture element electrode 103 or a drain electrode of the TFT 101, and the retention capacitor wiring Csn having provided an electrically insulating film therebetween. For example, a constant voltage is applied to the common electrode com and the retention capacitor wiring Csn.

The number of the sensor circuit 102 to be provided in the display region is optional. For example, the sensor circuit 102 is provided for each of the plurality of picture elements PIX or for each of pixels (for example, for each of pairs of R, G and B picture elements PIX). The sensor circuit 102 includes an output amplifier 102a, a photodiode 102b, and a capacitor 102c. The output amplifier 102a is made up of a TFT. The output amplifier 102a has a gate connected to an electrode herein referred to as a node netA, a drain connected to the source wiring Sm+1, and a source connected to the source wiring Sm. The photodiode 102b has an anode connected to the reset wiring Vrstn, and a cathode connected to the node netA. The capacitor 102c has a terminal connected to the node netA, and the other terminal connected to the readout control wiring Vrdn.

The sensor circuit 102 carries out touch sensing by detecting whether or not a shadow of a fingertip is made by an approach or a contact of the fingertip to a panel during a period other than a period during which data signals are written in the picture elements PIX. A voltage of the node netA is reset by a voltage of the reset wiring Vrstn via the photodiode 102b. Subsequently, the source of the output amplifier 102a outputs therefrom, as a sensor output voltage Vo, a voltage that appears at the node netA in accordance with an intensity of light received by the photodiode 102b, by use of a rise in pressure of the node netA caused by a change in voltage of the readout control wiring Vrdn. The sensor output voltage Vo is transmitted, via a sensor output wiring Vom that is the source wiring Sm+1, to a sensor reading circuit provided somewhere other than the display region. In this case, the output amplifier 102a functions as a source follower. Further, in this case, the source wiring Sm connected to the drain of the output amplifier 102a functions as a sensor power supply wiring Vsm to which a constant voltage is to be applied during light detection.

FIG. 22 shows a configuration of a display region where a contact point type touch sensor is provided.

In FIG. 22, the sensor circuit 102 of FIG. 21 is substituted with a sensor circuit 202.

The sensor circuit 202 includes a readout TFT 202a and a switching electrode 202b. The readout TFT 202a has a gate connected to a readout signal wiring Vrdm, a drain connected to a first electrode of the switching electrode 202b, and a source connected to a sensor output wiring Vom. The switching electrode 202b has a second electrode constituted by a common electrode com to which a voltage Vcom is to be applied.

In the sensor circuit 202, the first electrode of the switching electrode 202b contacts the second electrode of the switching electrode 202b in response to a pressure applied to a panel by a fingertip, to form a contact point. In this case, the readout TFT 202a is switched on by a voltage applied via the readout signal wiring Vrdm during a period other than a period during which data signals are written in picture elements PIX. This allows the voltage Vcom to be supplied to the sensor output wiring Vom via the switching electrode 202b and the readout TFT 202a. It is therefore possible to carry out touch sensing.

FIG. 23 shows a configuration of a display region in which a capacitance type touch sensor is provided.

In FIG. 23, the sensor circuit 102 of FIG. 21 is substituted with a sensor circuit 302.

The sensor circuit 302 includes an output amplifier 302a, a photodiode 302b, and capacitors 302c and 302d. The output amplifier 302a is made up of a TFT. The output amplifier 302a has a gate connected to an electrode referred to as a node netA, a drain connected to a source wiring Sm, and a source connected to a source wiring Sm+1. The photodiode 302b has an anode connected to a reset wiring Vrstn, and a cathode connected to the node netA. The capacitor 302c has a terminal connected to the node netA, and the other terminal connected to a readout control wiring Vrdn. The capacitor 302d has a terminal connected to the node netA, and the other terminal constituted by a common electrode com.

The sensor circuit 302 carries out touch sensing by detecting, during a period other than a period during which data signals are written in picture elements PIX, a change in capacitance value Ccvr of the capacitor 302d, which change is caused by a pressure applied to a panel by a fingertip. The photodiode 302b is provided for causing the sensor circuit 302 to operate as an optical sensor circuit as with the sensor circuit 102. The photodiode 302b also has a diode property that is utilized for causing the sensor circuit 302 to operate as a touch sensor circuit. A voltage of the node netA is reset via the photodiode 302b, and then a voltage of the readout control wiring Vrdn is changed. This causes the voltage of the node netA to have a value corresponding to a value of the capacitor 302c, and the capacitance value Ccvr of the capacitor 302d, which capacitance value Ccvr is determined depending on the pressure. Therefore, a voltage that appears at the node netA is transmitted as a sensor output voltage Vo from the source of the output amplifier 102a via a sensor output wiring Vom that is the source wiring Sm+1 to a sensor reading circuit provided somewhere other than the display region. In this case, the output amplifier 302a functions as a source follower. Further, in this case, the source wiring Sm functions as a sensor power supply wiring Vsm to which a constant voltage is to be applied.

FIG. 24 shows a configuration of a contact point type touch sensor disclosed in Patent Literature 1.

Specifically, FIG. 24 is a cross-sectional view of a liquid crystal display device with which a user's finger or the like is in contact. The liquid crystal display device includes a lower display board 100, an upper display board 200, and a liquid crystal layer 3 sandwiched between the lower display board 100 and the upper display board 200. The lower display board 100 includes an electrically insulating substrate 110, and a pixel layer 115 provided on the electrically insulating substrate 110. The pixel layer 115 includes, for example, pixels and a sensing section. From the pixel layer 115 are exposed input terminal electrodes 196 of sensing elements of a contact sensing section.

The upper display board 200 includes a substrate 210, and light-shielding members 220 provided on the substrate 210. The light-shielding members 220 prevent light leakage between pixels. A plurality of color filters 230 are provided on the substrate 210 and the light-shielding members 220. A cover film 250 is provided on the color filters 230 and the light-shielding members 220 to protect the color filters 230 and flatten a surface of the color filters 230. On the cover film 250 are provided a plurality of projections 240 made from, for example, an organic material. Specifically, the projections 240 are provided so as to face the input terminal electrodes 196 of the sensing elements, respectively. On the cover film 250 and the projections 240 is provided a common electrode 270. The lower display board 100 and the upper display board 200 are supported by a plurality of bead spacers 320. This allows the common electrode 270 covering the projections 240, and the input terminal electrodes 196 to keep having therebetween a constant interval which falls within a range from 0.1 μm to 1.0 μm.

The common electrode 270 covering the projections 240, and the input terminal electrodes 196 constitute a switch of the contact sensing section.

The common electrode 270 covering the projections 240 which is a contact point is electrically and physically connected to the input terminal electrodes 196 of the lower display board 100, in response to a pressure applied to the upper display board 200 by a contact. This causes a common voltage Vcom to be carried to the input terminal electrodes 196, thereby flowing sensing current through the sensing elements.

CITATION LIST

Patent Literatures

Patent Literature 1

Japanese Patent Application Publication, Tokukai No. 2006-133788 A (Publication Date: May 25, 2006)

Patent Literature 2

Japanese Patent Application Publication, Tokukai No. 2001-42296 A (Publication Date: Feb. 16, 2001)

SUMMARY OF INVENTION

Technical Problem

However, in a liquid crystal display device including the contact point type touch sensor disclosed in Patent Literature 1, the common electrode 270 that is an electrode of the contact sensing section, and the input terminal electrodes 196 face the liquid crystal layer. Therefore, an alignment film formed in a production process results in being provided on an outermost surface of each of the common electrode 270 and the input terminal electrodes 196. The alignment films are made from an electrically non-conducting dielectric. It is therefore difficult to be electrically stable in connection between the common electrode 270 and the input terminal electrodes 196.

In order to attain stability in electrical connection between the common electrode 270 and the input terminal electrodes 196 during touch sensing, a strong pressure that almost breaks through the alignment films should be applied to a panel.

In this case, the alignment films are separated from the common electrode 270 and the input terminal electrodes 196 due to a contact between the common electrode 270 and the input terminal electrodes 196, and therefore pieces of the alignment films float in the liquid crystal layer. This causes a pixel defect. In order to prevent the pixel defect, for example, the alignment films should be removed from the common electrode 270 and the input terminal electrodes 196. This causes inconvenience.

Even in a case where an optical sensor type touch sensor is employed in order to prevent such a contact problem, since a photodiode has a property that current for switching on the photodiode is saturated at a constant luminous intensity or greater such as not less than 100 lx, entry of direct light having a luminous intensity of 50000 lx through 100000 lx from a periphery of a region surrounding a fingertip causes insufficient reduction in luminous intensity of a detected part as compared to a periphery of the detected part, thereby saturating the current for switching on the photodiode as with the periphery. This makes it impossible to detect a region that is in contact with the fingertip, or a region which the fingertip approaches.

In contrast, under a low luminous intensity environment having a luminous intensity as low as several hundreds of lx, a sensor circuit reacts to a shadow other than that of a fingertip. This causes a malfunction.

As described above, an optical sensor circuit causes malfunctions under a high luminous intensity environment and the low luminous intensity environment. Therefore, the optical sensor type touch sensor cannot be unconditionally substituted with the contact point type touch sensor.

Even in a case where a capacitance type touch sensor is employed in order to prevent such a contact problem, malfunctions are likely to be caused by an external factor such as temperature change or static electricity. The malfunctions are caused because capacitance of a liquid crystal layer for detecting a change in capacitance value is as small as several pF, and therefore it is originally difficult to detect the change in capacitance value. Liquid crystal capacitance is changed by a temperature, and is also changed by static electricity, or electrolytic noise from a signal wiring of a liquid crystal display device. Therefore, capacitance change quantity to be detected becomes close to a noise level, and an S/N ratio for detection is deteriorated.

As described above, there was a conventional problem that it was difficult to attain stability in electrical connection between electrodes in the contact point type touch sensor. Further, a liquid crystal display device that (i) includes a non-contact type touch sensor having a preferable property and (ii) can prevent such a conventional problem was not provided.

The present invention was made in view of the conventional problem, and an object of the present invention is to provide a display device including a non-contact type touch sensor having a preferable property, which can be substituted for a contact point type touch sensor.

Solution to Problem

In order to attain the object, a display device of the present invention, including a first circuit that includes a first electrode, a field effect transistor, and a switch, the first electrode being provided on a first substrate having a display surface of a display panel, and connected to a common electrode, the field effect transistor being provided on a second substrate in such a manner that the first electrode is provided in a back channel side of the field effect transistor so as to be separated from the field effect transistor, the field effect transistor having a gate terminal and a first drain/source terminal each of which is connected to a first wiring to which a voltage for reset is to be applied, the reset being to switch on the field effect transistor by applying, to the gate terminal, the voltage that is applied to the first wiring, and the switch having a terminal connected to a second drain/source terminal, and the other terminal connected to a second wiring from which an output of the field effect transistor is provided.

According to the present invention, the first electrode is distant from the second substrate while no pressure is being applied to the display surface of the first substrate. Therefore, even in a case where the voltage is applied to the first wiring, a back gate effect on the field effect transistor caused by the first electrode is small. This allows the field effect transistor to be being switched off, and also allows leak current not to be generated in the back channel. Since no pressure is applied, the voltage supplied to the second drain/source terminal of the field effect transistor after the reset does not change from a voltage obtained before the reset. Therefore, in a case where the switch is turned on, the voltage has not changed since before the reset, and it is possible to detect absence of an applied pressure on the basis of the output of the field effect transistor provided from the second wiring.

Meanwhile, the first electrode moves closer to the second substrate while a pressure is being applied to the display surface of the first substrate. Therefore, in a case where the voltage is applied to the first wiring, the back gate effect caused by the first electrode is increased. This allows leak current to be generated in the back channel of the field effect transistor, thereby increasing an absolute value of the voltage of the source of the field effect transistor. The voltage supplied to the second drain/source terminal of the field effect transistor after the reset is changed by the pressure thus applied. Therefore, in a case where the field effect transistor is sufficiently being switched off, and then the switch is turned on, the voltage has been changed by the pressure thus applied, and it is possible to detect presence of the pressure thus applied on the basis of the output of the field effect transistor provided from the second wiring.

In this manner, it is possible to detect whether or not a pressure is applied to the display surface, on the basis of the output of the field effect transistor provided from the second wiring.

According to the configuration of the first circuit, it is possible to obtain a detection signal corresponding to whether or not a pressure is applied to the display surface even in a case where the first electrode is not in electric contact with the second substrate. An applied pressure can be detected without a movable electric point. This makes it unnecessary to apply a strong pressure to the display surface, thereby preventing film separation in a sensor circuit. Hence, a touch sensor circuit excellent in durability can be obtained.

Further, malfunctions are not caused under a high luminous intensity environment and a low luminous intensity environment, unlike an optical sensor circuit. This is because an optical sensor is not employed for detection of an applied pressure. Furthermore, unlike a capacitance type touch sensor, malfunctions are unlikely to be caused by an external factor such as temperature change or static electricity. It is therefore possible to carry out a detection excellent in S/N ratio.

It is therefore possible to provide a display device including a non-contact type touch sensor having a preferable property, which can be substituted for a contact point type touch sensor.

Further, electric current that flows through the field effect transistor can be set to great electric current. It is therefore possible to reduce element sizes of the field effect transistor and the switch. This allows reduction in voltage for creation of a detection signal, and increase in aperture ratio of a display region.

Further, unlike the optical sensor circuit, great capacitance for rise in pressure is not required. This can simplify a process, and increase the aperture ratio of the display region.

Further, since the first electrode is connected to the common electrode, it is possible to easily configure the first electrode that is shifted with the first substrate by an applied pressure. It is also possible to simultaneously form the first electrode and the common electrode. This simplifies a process for forming them. Further, it is possible to use a common voltage as a voltage to be applied to the first electrode. This can simplify the touch sensor circuit.

Advantageous Effects of Invention

A display device of the present invention, including a first circuit that includes a first electrode, a field effect transistor, and a switch, the first electrode being provided on a first substrate having a display surface of a display panel, and connected to a common electrode, the field effect transistor being provided on a second substrate in such a manner that the first electrode is provided in a back channel side of the field effect transistor so as to be separated from the field effect transistor, the field effect transistor having a gate terminal and a first drain/source terminal each of which is connected to a first wiring to which a voltage for reset is to be applied, the reset being to switch on the field effect transistor by applying, to the gate terminal, the voltage that is applied to the first wiring, and the switch having a terminal connected to a second drain/source terminal, and the other terminal connected to a second wiring from which an output of the field effect transistor is provided.

Hence, it is possible to provide a display device including a non-contact type touch sensor having a preferable property, which can be substituted for a contact point type touch sensor.

BRIEF DESCRIPTION OF DRAWINGS

FIG. 4 is a circuit diagram showing a configuration of a modified example of the touch sensor circuit of FIG. 1.

FIG. 5 is a plain view showing a pattern arrangement of the display region of FIG. 2.

FIG. 7(a) is a cross-sectional view showing a configuration of the touch sensor circuit to which no pressure is applied. FIG. 7(b) is an equivalent circuit diagram obtained in a case of FIG. 7(a).

FIG. 8(a) is a cross-sectional view showing a configuration of the touch sensor circuit to which a pressure is applied. FIG. 8(b) is an equivalent circuit diagram obtained in a case of FIG. 8(a).

FIG. 16 is a waveform diagram showing an operation of the touch sensor circuit of FIG. 12.

FIG. 17(a) is a cross-sectional view showing a configuration of the touch sensor circuit to which no pressure is applied. FIG. 17(b) is an equivalent circuit diagram obtained in a case of FIG. 17(a).

FIG. 18(a) is a cross-sectional view showing a configuration of the touch sensor circuit to which a pressure is applied. FIG. 18(b) is an equivalent circuit diagram obtained in a case of FIG. 18(a).

DESCRIPTION OF EMBODIMENTS

Examples 1 and 2 explain an embodiment of the present invention with reference to FIGS. 1 through 20.

Example 1

Figure 7:
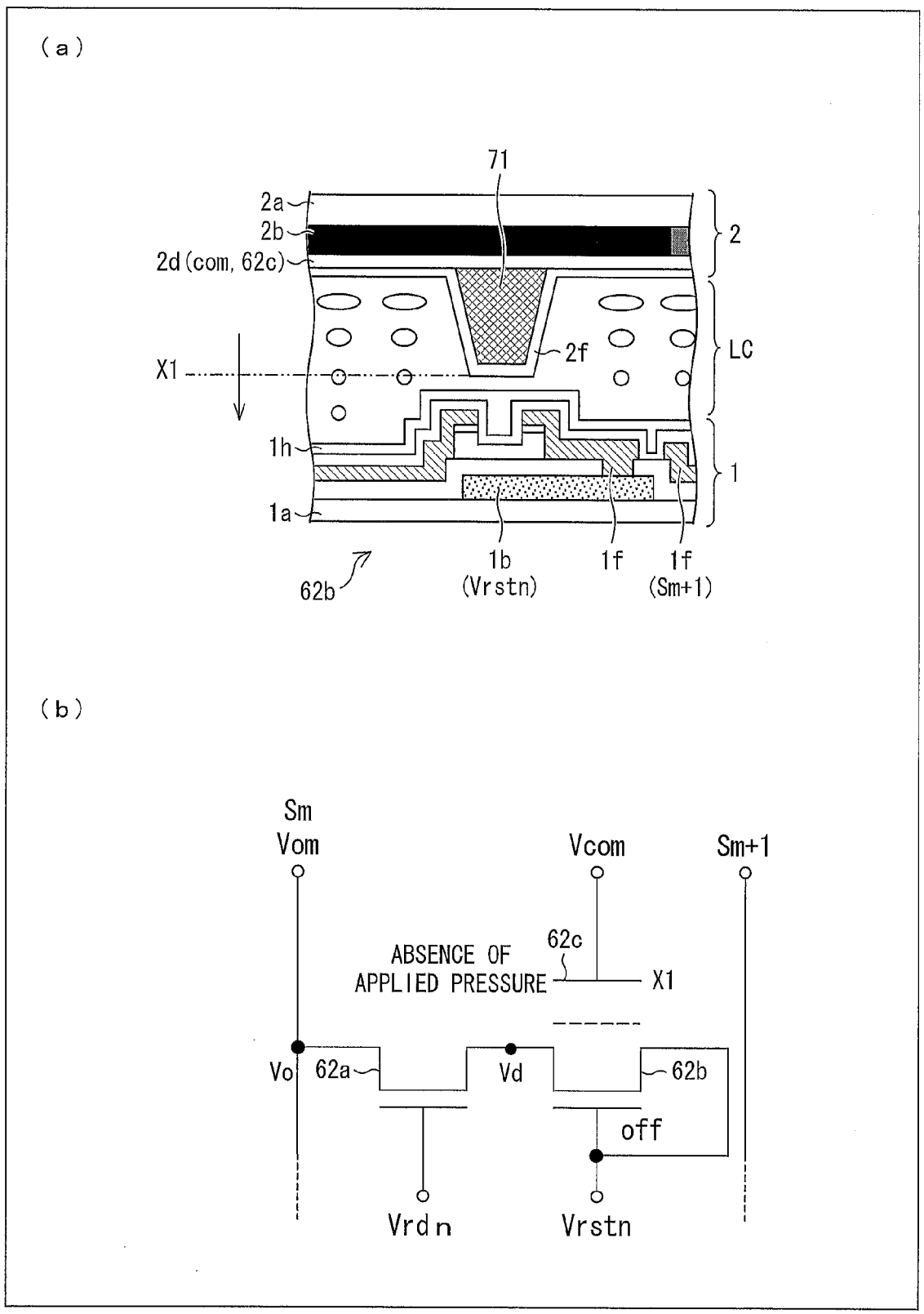
FIG. 7 is an explanatory view of an operation of the touch sensor circuit of FIG. 1.
Figure 8:
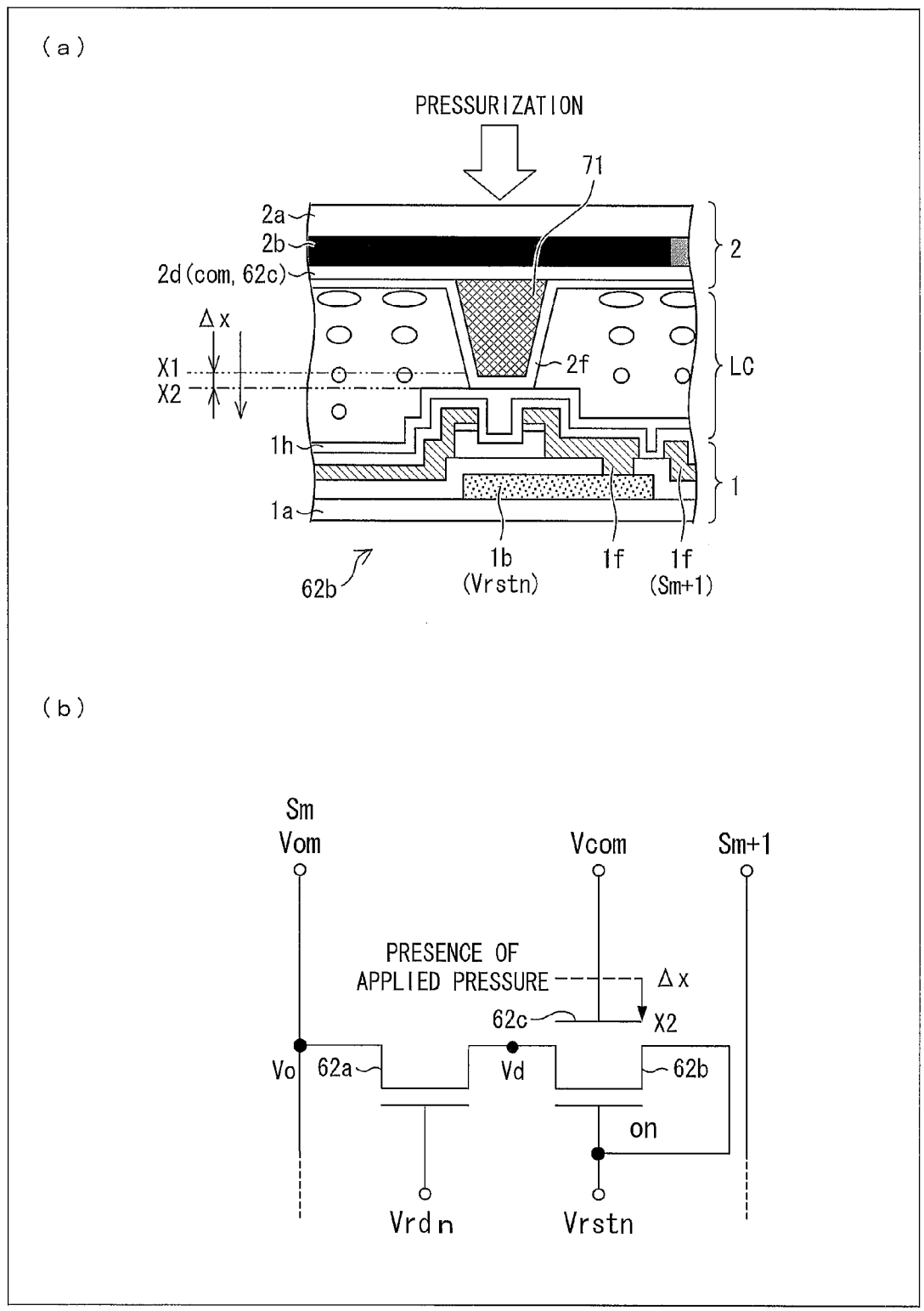
FIG. 8 is an explanatory view of an operation of the touch sensor circuit of FIG. 1.
Figure 9:
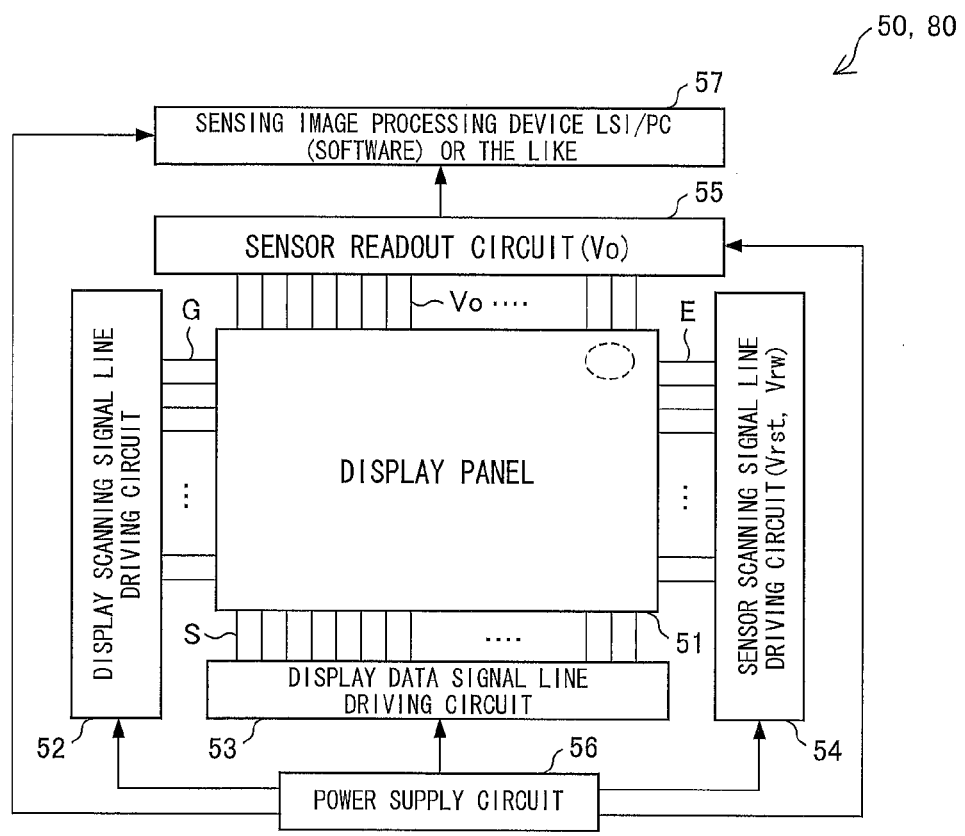
FIG. 9 shows an embodiment of the present invention, and is a block diagram showing a configuration of a display device.

The following description will discuss an embodiment of the present invention with reference to FIGS. 1 through 11. FIG. 9 shows a configuration of a liquid crystal display device (display device) 50 of Example 1.

The liquid crystal display device 50 is an active matrix display device including a display panel 51, a display scanning signal line driving circuit 52, a display data signal line driving circuit 53, a sensor scanning signal line driving circuit 54, a sensor reading circuit 55, a power supply circuit 56, and a sensing image processing device 57.

The display panel 51 includes a display region in which (i) a plurality of gate wirings G and a plurality of source wirings S provided so as to intersect with each other and (ii) picture elements PIX provided in a matrix manner at respective intersections where the plurality of gate wirings (scanning signal lines) G and the plurality of source wirings (data signal lines) S intersect with each other are provided.

The display scanning signal line driving circuit 52 sequentially supplies, to the gate wirings G, scanning signals in response to which the picture elements PIX are selected for writing of data signals, so as to drive the gate wirings G. The display data signal line driving circuit 53 supplies data signals to the source wirings S to drive the source wirings S. The sensor scanning signal line driving circuit (a driving circuit of a first circuit) 54 sequentially supplies, to the sensor scanning signal lines E, scanning signals (voltage Vrst, voltage Vrd) in response to which sensor circuits are operated, so as to sequentially drive the sensor scanning signal lines E. The sensor reading circuit 55 reads, from sensor output wirings (second wirings) Vo, sensor output voltages Vo (for the sake of convenience, to which reference signs identical to those of the sensor output wirings are attached). The power supply circuit 56 supplies, to the display scanning signal line driving circuit 52, the display data signal line driving circuit 53, the sensor scanning signal line driving circuit 54, the sensor reading circuit 55, and the sensing image processing device 57, power required for operations of the circuits and the device. The sensing image processing device 57 analyzes, on the basis of the sensor output voltages Vo read by the sensor reading circuit 55, distribution of a sensor detection result obtained in the display panel.

The display scanning signal line driving circuit 52, the display data signal line driving circuit 53, or like circuit can have a function of the sensor scanning signal line driving circuit 54 or the sensor reading circuit 55. The sensing image processing device 57 can has a function of the sensor reading circuit 55. The sensing image processing device 57 can be provided in the liquid crystal display device 50 as, for example, an LSI or a computer. Alternatively, the sensing image processing device 57 can be provided outside of the liquid crystal display device 50. Similarly, the sensor reading circuit 55 can also be provided outside of the liquid crystal display device 50.

Figure 2:
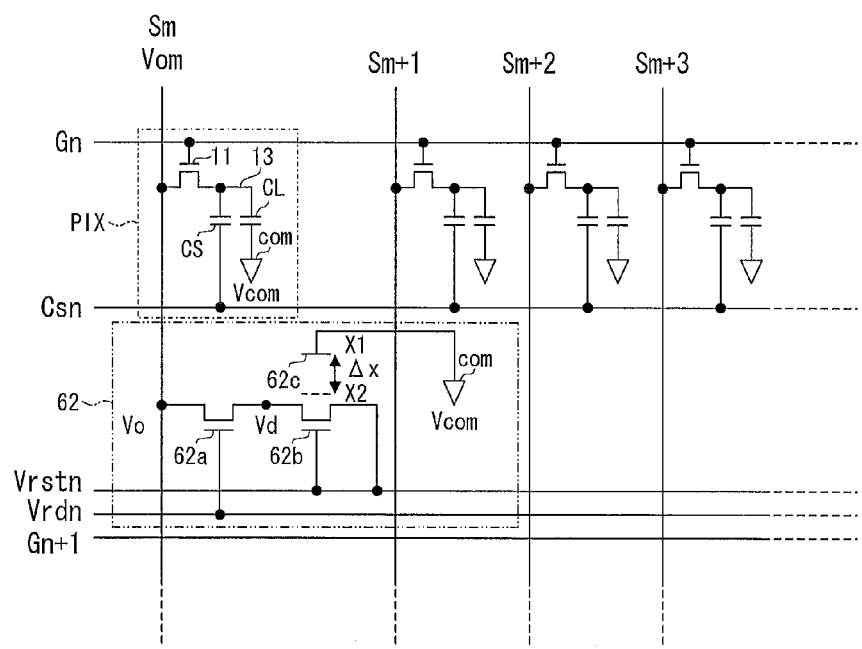
FIG. 2 shows an example of the present invention, and is a circuit diagram showing a configuration of a display region of a display device.

FIG. 2 shows a detailed configuration of the display region. FIG. 2 specifically shows a configuration of the n-th line of the display region. In the n-th line are provided (i) a plurality of picture elements PIX defined by a gate wiring Gn, source wirings S (Sm through Sm+3 of FIG. 2), and a retention capacitor wiring Csn, and (ii) at least one touch sensor circuit 62 connected to a reset wiring (first wiring) Vrstn and a readout control wiring Vrdn that serve as different types of sensor scanning signal lines E (see FIG. 9). The retention capacitor wiring Csn, the reset wiring Vrstn, and the readout control wiring Vrdn are provided so as to be parallel to the gate wiring Gn. The reset wiring Vrstn is provided for each of lines of picture elements PIX, and a voltage Vrst is sequentially applied to the reset wirings Vrstn. The voltage Vrst thus applied can simultaneously drive the touch sensor circuit 62 provided for each of the plurality of picture elements PIX provided in one of the lines. It is therefore possible to detect pressures that are simultaneously applied to a plurality of display regions of an identical line.

Each of the picture elements PIX includes a TFT 11 serving as a selection element, a liquid crystal capacitor CL, and a retention capacitor CS. The TFT 11 has a gate connected to the gate wiring Gn, a source connected to corresponding one of the source wirings S, and a drain connected to a picture element electrode 13. The liquid crystal capacitor CL is a capacitor formed by the picture element electrode 13 and a common electrode com having a liquid crystal layer therebetween. The retention capacitor CS is a capacitor formed by (i) the picture element electrode 13 or a drain electrode of the TFT 11 and (ii) the retention capacitor wiring Csn having provided an electrically insulating film therebetween. For example, a constant voltage is applied to the common electrode com and the retention capacitor wiring Csn.

The number of the touch sensor circuit 62 to be provided in the display region is optional. For example, the touch sensor circuit 62 is provided for each of the plurality of picture elements PIX or for each of pixels (for example, for each of sets of R, G and B picture elements PIX). The touch sensor circuit 62 includes a first circuit in which TFTs 62a and 62b, and an electrode 62c are provided. In Example 1, the first circuit itself constitutes the touch sensor circuit 62. The TFT (switch) 62a has a gate terminal connected to the readout control wiring Vrdn, one of drain/source terminals (the other terminal) which is connected to the source wiring Sm that is one of the source wirings S, that is, to a sensor output wiring Vo, and the other of the drain/source terminals (a terminal) which is connected to a source of the TFT (field effect transistor) 62b. The TFT 62b has a gate terminal and a drain terminal (first drain/source terminal) each of which is connected to the reset wiring Vrstn, and a source terminal (second drain/source terminal) connected to the other of the drain/source terminals of the TFT 62a.

The electrode (first electrode) 62c is provided in a back channel side of the TFT 62b so as to be separated from the TFT 62b, and functions as a back gate electrode of the TFT 62b. The electrode 62c is connected to the common electrode com. As is clear from the following description, the TFT 62b utilizes a general effect of a field effect transistor. Note that leak current is great particularly in a TFT.

Further, elements other than the above-described elements can be provided in the touch sensor circuit 62.

During a period other than a period during which data signals are written in the picture elements PIX, for example, during a horizontal flyback period, the touch sensor circuit 62 of FIG. 2 (i) controls whether to switch on the TFT 62b according to whether or not a shift Δx of the electrode 62c is caused by a pressure applied to a counter substrate, thereby causing the TFT 62a to supply a sensor output signal Vo to a sensor output wiring Vom. The sensor reading circuit 55 detects, from the sensor output signal Vo supplied via the sensor output wiring Vom, whether or not a pressure is applied to a display surface.

The touch sensor circuit 62 can have a configuration shown in FIG. 4.

In FIG. 4, a sensor output wiring Vom is a wiring other than source wirings S. A TFT 62a has a first drain/source terminal connected to the sensor output wiring Vom. A TFT 62b has a first drain/source terminal connected to a reset wiring Vrstn.

Figure 1:
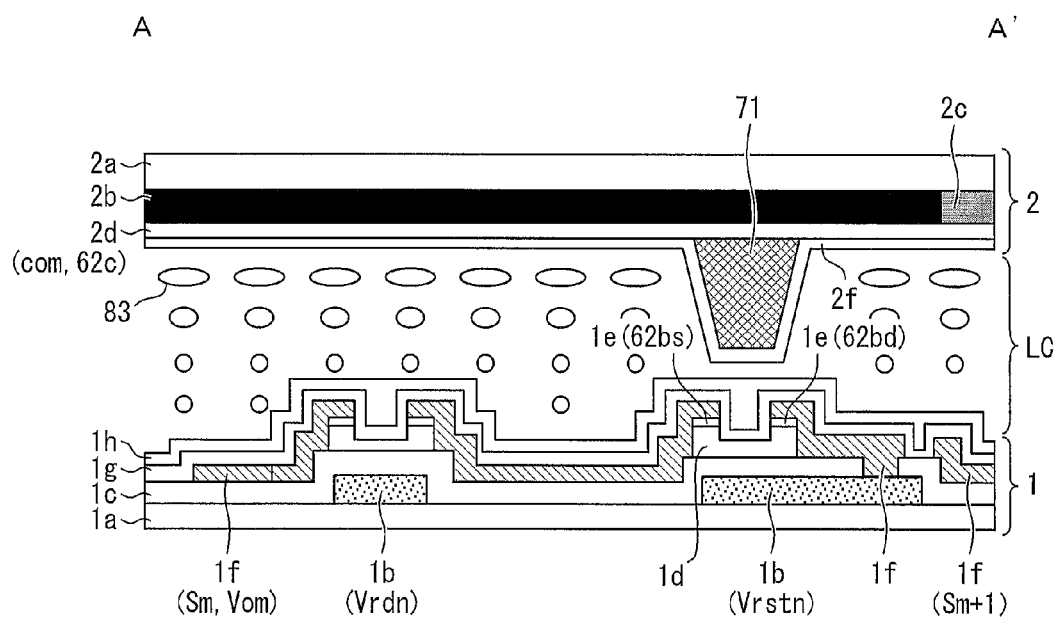
FIG. 1 shows an example of the present invention, and is a cross-sectional view showing a configuration of a touch sensor circuit provided in a display device.

FIG. 5 is a plain view of the touch sensor circuit 62 of FIG. 2. FIG. 1 is a cross-sectional view taken along A-A' line of FIG. 5.

As shown in FIG. 5, in the picture element PIX, the TFT 11 has a gate 11g connected to the gate wiring Gn, a source 11s connected to corresponding one of the source wirings S (Sm, Sm+1 and Sm+2), and a drain 11d connected to the picture element electrode 13 via a contact hole 11h formed above the retention capacitor wiring Csn. Further, the retention capacitor CS is formed by the drain 11d and the retention capacitor wiring Csn.

In the touch sensor circuit 62 of FIG. 5, the TFT 62a has the gate terminal connected to the readout control wiring Vrdn, a drain/source terminal 62 as connected to the sensor output wiring Vom (the drain/source terminal 62 as is one of a pair of drain/source terminals), and a drain/source terminal 62ad connected to a source terminal 62bs of the TFT 62b (the drain/source terminal 62ad is the other of the pair of drain/source terminals). The TFT 62b has a gate terminal 62bg and a drain terminal 62bd each of which is connected to the reset wiring Vrstn.

A pillar projection 71 is provided on the electrode 62c above the TFT 62b. A light-shielding film (black matrix) 2b is provided in a region where the TFTs 62a and 62b are provided, that is, in a region sandwiched (i) between the source wiring Sm (the sensor output wiring Vom) and the source wiring Sm+1 that are adjacent to each other, and (ii) between the readout control wiring Vrdn and the reset wiring Vrstn that are adjacent to each other, so that light from a display surface side is shielded.

FIG. 1 shows a cross-sectional configuration of a region where the touch sensor circuit 62 is provided. In the region, a liquid crystal layer LC is provided between a TFT substrate 1 and a counter substrate 2, as with a region where the picture element PIX is provided. In the liquid crystal layer LC, liquid crystal molecules 83 are aligned in a direction defined by liquid crystal alignment films 1h and 2f (later described).

The TFT substrate (second substrate) 1 is configured by forming an electrically insulating substrate 1a, a gate metal 1b, a gate insulating film 1c, an i layer 1d of Si, an n+ layer 1e of Si, a source metal 1f, a passivation film 1g, and the liquid crystal alignment film 1h in this order. The readout control wiring Vrdn and the reset wiring Vrstn are constituted by the gate metal 1b. The source wiring Sm (the sensor output wiring Vom) and the source wiring Sm+1 are constituted by the source metal 1f. The n+ layer 1e that corresponds to the drain terminal 62bd of the TFT 62b is connected to the reset wiring Vrstn via the source metal 1f. The liquid crystal alignment film 1h is made from, for example, polyimide.

The counter substrate (first substrate) 2 is configured by forming an electrically insulating substrate 2a, the light-shielding film 2b and a color filter 2c, a transparent electrode 2d, the pillar projection 71, and the liquid crystal alignment film 2f in this order. The transparent electrode 2d constitutes the common electrode com. In Example 1, the electrode 62c is constituted by the common electrode com itself, and therefore the electrode 62c is not distinguished from the common electrode com. That is, generally, the electrode 62c is being connected to the common electrode com.

The pillar projection 71 is made from a dielectric, and is provided on the common electrode 2d so as to project from the back channel side of the TFT 62b of the counter substrate 2 toward the TFT substrate 1. The alignment film 2f provided in an edge side of the pillar projection 71 is separated from the TFT substrate 1 while a user's finger or the like applies no pressure to the counter substrate 2. The alignment film 2f is movable to be in contact with the TFT substrate 1 in response to a pressure applied to the counter substrate 2 by a user's finger or the like. In FIGS. 2 and 4, Δx represents a shift of the counter substrate 2 caused by the pressure. The counter substrate 2 is located at X1 while no pressure is being applied to the counter substrate 2. The counter substrate 2 moves in response to the pressure applied to the counter substrate 2, and then stops at X2.

Figure 3:
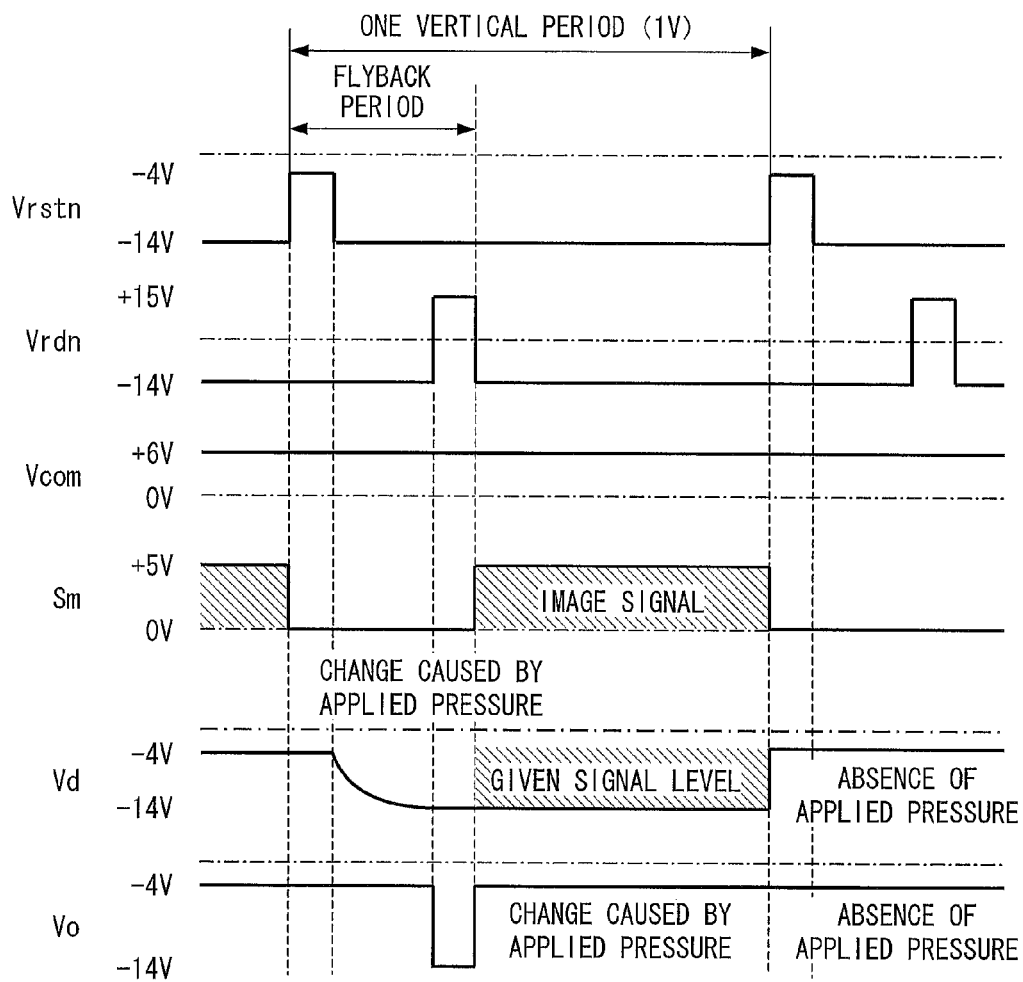
FIG. 3 is a waveform diagram showing an operation of the touch sensor circuit of FIG. 1.

The following description will discuss an operation of the touch sensor circuit 62 with reference to FIGS. 3, 7 and 8. Each of FIGS. 7 and 8 is an explanatory view of the operation of the touch sensor circuit 62.

As shown in a waveform diagram of FIG. 3, touch sensor circuits 62 provided in one of lines are driven by positive reset pulses of High −4 V and Low −14 V applied to the reset wiring Vrstn, and positive readout pulses of High +15 V and Low −14 V applied to the readout control wiring Vrdn. The positive reset pulses and the positive readout pulses are applied during each of vertical periods (1V). The readout pulse of High +15 V is applied in a predetermined period of time after the reset pulse of High −4 V is applied. In a case where the sensor output wiring Vom is employed for detection of a corresponding pressurized region of a screen, a series of operations from a start of application of the reset pulse to an end of application of the readout pulse should be carried out during a flyback period of a vertical period without scanning of the lines. Alternatively, the series of operations from a start of application of the reset pulse to an end of application of the readout pulse can be carried out during a period of each of horizontal periods, which period is other than a period during which image signals are written, while the lines are being scanned. In this case, it is possible to detect pressures applied to a plurality of corresponding pressurized regions of a screen provided that the sensor output wiring Vom for use in detection of the plurality of corresponding pressurized regions is present. Alternatively, each of the lines is scanned during each of flyback periods of a vertical period, so that a pressure applied to at least one pressurized region can be detected during a certain period of time.

The TFT 62b has a back channel covered with a passivation film of, for example, SiNx having a thickness of several thousands of angstrom. It is, however, possible to carry leak current to the back channel by a back gate effect caused by a voltage applied to the electrode 62c. In Example 1, quantity of the leak current, that is, magnitude of the back gate effect is controlled by an interval between the electrode 62c and the TFT 62b.

While no pressure is being applied to a display surface of the counter substrate 2, the electrode 62c is located at X1, and the alignment film 2f provided in the edge side of the pillar projection 71 is separated from the TFT substrate 1, specifically, from the alignment film 1h (see FIG. 7(a)), even in a case where a reset pulse is applied to the reset wiring Vrstn. Therefore, as shown in FIG. 7(b), the back gate effect caused by the voltage applied to the electrode 62c is small, and leak current is not carried to the back channel even in a case where the TFT 62b is being switched off. This allows the TFT 62b to be sufficiently being switched off. Therefore, as shown in FIG. 3, a voltage Vd of the source of the TFT 62b remains −4 V that is an initial value even after the reset pulse is applied. Since no pressure is applied, the voltage Vd of the source of the TFT 62b, which voltage Vd is obtained after execution of a reset for switching on the TFT 62b by the reset pulse of the reset wiring Vrstn applied to the gate terminal of the TFT 62b, does not change from a voltage Vd of the source of the TFT 62b, which voltage Vd is obtained prior to the reset. Therefore, in a case where the TFT 62a is being switched on by the readout pulse applied after the reset pulse is applied, the voltage Vd of the source of the TFT 62b, which voltage Vd is provided from the sensor output wiring Vom, that is, a sensor output voltage Vo remains −4 V without having changed since before the reset. It is therefore possible to detect absence of an applied pressure.

In contrast, while a pressure is being applied to the display surface of the counter substrate 2, the electrode 62c shifts by Δx from X1 to X2 in response to a reset pulse applied to the reset wiring Vrstn, so that the alignment film 2f provided in the edge side of the pillar projection 71 comes in contact with the TFT substrate 1, specifically, with the alignment film 1h (see FIG. 8(a)). Therefore, as shown in FIG. 8(b), the back gate effect caused by the voltage applied to the electrode 62c is increased, and leak current is carried to the back channel of the TFT 62b. This reduces the voltage Vd of the source of the TFT 62b after the reset pulse is applied (see FIG. 3). That is, an absolute value is increased. Reduction in the voltage Vd changes depending on Δx. However, in Example 1, the voltage Vd always reaches a constant voltage value because the electrode 62c shifts in response to the pressure thus applied, and then stops at X2. As described above, the voltage Vd of the source of the TFT 62b, which voltage Vd is obtained after the reset, is changed by the pressure thus applied. Therefore, in a case where the TFT 62b is sufficiently being switched off, that is, the voltage Vd of the source of the TFT 62b reaches the constant voltage value, and then the TFT 62a is switched on by a readout pulse applied in a predetermined period of time, the voltage Vd of the source of the TFT 62b has been changed by the pressure thus applied, and the voltage Vd of the source of the TFT 62b, which voltage Vd is provided from the sensor output wiring Vom, that is, the sensor output voltage Vo becomes −14 V. It is therefore possible to detect presence of the pressure thus applied.

As such, it is possible to detect whether or not a pressure is applied to the display surface by detecting the sensor output voltage Vo whose polarity is negative by use of the sensor readout circuit 55.

During a period during which image data is written, the source wiring Sm of FIG. 2 receives an image signal, and has a given voltage corresponding to the image signal.

According to the configuration of the touch sensor circuit 62, it is possible to obtain a detection signal corresponding to whether or not a pressure is applied to the display surface, even in a case where the electrode 62c is not in electrical contact with the TFT substrate 1 in response to an applied pressure. In other words, an applied pressure can be detected without a movable electric point. This makes it unnecessary to apply a strong pressure to the display surface, thereby preventing film separation in the touch sensor circuit 62. Hence, a touch sensor circuit excellent in durability can be obtained.

Further, malfunctions are not caused under a high luminous intensity environment and a low luminous intensity environment, unlike an optical sensor circuit. This is because an optical sensor is not employed for detection of an applied pressure. Furthermore, unlike a capacitance type touch sensor, malfunctions are unlikely to be caused by an external factor such as temperature change or static electricity. It is therefore possible to carry out a detection excellent in S/N ratio.

The TFT 62b connected to the reset wiring Vrstn of the touch sensor circuit 62 has an electric potential of −14 V while being in an off state. An absolute value of the electric potential is 14 V. The absolute value of 14 V is greater than 12 V that is an absolute value of an electric potential of +12 V obtained in a case where the source wiring Sm+1 also serves as the sensor power supply wiring Vsm during dot inversion driving of the liquid crystal display device 50. The absolute value of 14 V is also greater than 6 V that is an absolute value of an electric potential of +6 V obtained in a case where the source wiring Sm+1 also serves as the sensor power supply wiring Vsm during line inversion driving of the liquid crystal display device 50. It is therefore possible to carry out a detection excellent in S/N ratio.

In this manner, it is possible to provide a display device including a non-contact type touch sensor having a preferable property, which can be substituted for a contact point type touch sensor.

Further, electric current that flows through the TFT 62b can be set to great electric current. It is therefore possible to reduce element sizes of the TFT 62b and the TFT 62a. This allows reduction in voltage for creation of a detection signal, and increase in aperture ratio of a display region.

Further, unlike the optical sensor circuit, great capacitance for rise in pressure is not required. This makes it possible to simplify a process, and increase the aperture ratio of the display region.

In the touch sensor circuit 62, the electrode 62c is connected to the common electrode com. It is therefore possible to easily configure the electrode 62c that is shifted with the counter substrate 2 by an applied pressure. It is also possible to simultaneously form the electrode 62c and the common electrode com. This simplifies a process for forming them. Further, a common voltage Vcom can be used as a voltage to be applied to the electrode 62c. This can simplify the touch sensor circuit 62.

The touch sensor circuit 62 includes the pillar projection 71, made from a dielectric, which is provided on the electrode 62c. This makes it easy to cause the electrode 62c to function as the back gate of the TFT 62b even in a case where an inclusion such as the liquid crystal layer LC, or a space is provided between the TFT substrate 1 and the counter substrate 2. It is therefore possible to enhance a sensitivity at which an applied pressure is detected. The pillar projection 71 can be a pillar projection made from an electric conductor, or a pillar projection made from a dielectric body covered with an electric conductor, other than the pillar projection made from the dielectric.

The edge side of the pillar projection 71 is separated from the TFT substrate 1 while no pressure is being applied to the counter substrate 2. The edge side of the pillar projection 71 can move to be in contact with the TFT substrate 1 in response to a pressure applied to the counter substrate 2. It is therefore possible to stably realize (i) a non-pressurized state in which the pillar projection 71 does not positionally change and (ii) a pressurized state in which the edge side of the pillar projection 71 stops moving when coming in contact with the TFT substrate 1. This unlikely causes malfunctions in detection of an applied pressure.

The touch sensor circuit 62 is provided in the display region. It is therefore possible to provide a plurality of touch sensor circuits 62 in a display matrix. This also makes it possible to deal with multipoint input that is strongly required, by utilization of a property of less occurrence of malfunctions.

In the touch sensor circuit 62 of FIG. 2, the sensor output wiring Vom is the source wiring S. The source wiring S serves as the sensor output wiring Vom during a period other than a period during which data is written in picture elements PIX. This allows reduction in the number of wirings, thereby increasing the aperture ratio of the display region.

Meanwhile, in the touch sensor circuit 62 of FIG. 4, the sensor output wiring Vom is a wiring other than the source wiring S. This configuration makes it possible to employ the sensor output wiring Vom for driving of the touch sensor circuit 62 regardless of whether to be during the period during which data is written in picture elements PIX. It is therefore possible to detect an applied pressure at a timing excellent in flexibility.

The touch sensor circuit 62 includes the liquid crystal layer LC provided between that region of the counter substrate 2 in which the electrode 62c is provided and that region of the TFT substrate 1 in which the TFT 62b is provided. This configuration makes it possible to employ, for configuration of a region of the touch sensor circuit 62, the liquid crystal layer LC itself for creation of picture elements PIX, in the liquid crystal display device 50.

The touch sensor circuit 62 includes the liquid crystal alignment film (1h, 2f) provided on at least either that region of the counter substrate 2 in which the electrode 62c is provided or that region of the TFT substrate 1 in which the TFT 62b is provided. This configuration makes it possible to employ, for the region of the touch sensor circuit 62, the alignment film itself for creation of picture elements PIX, without damaging the alignment film.

The touch sensor circuit 62 of FIG. 5 includes the light-shielding film 2b. This can favorably prevent the touch sensor circuit 62 from being erroneously operated due to external light, thereby improving stability in detection of an applied pressure.

Figure 6:
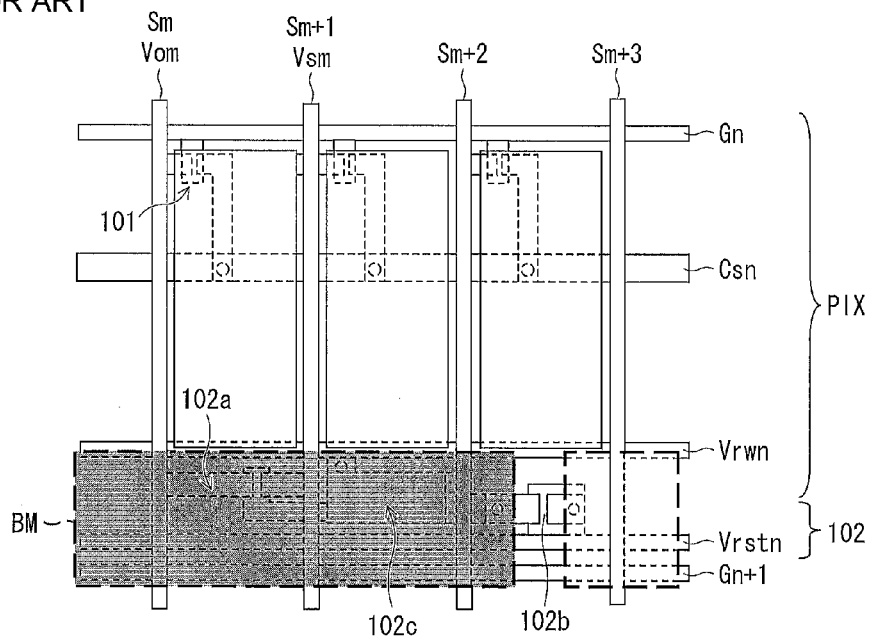
FIG. 6 is a plain view showing a pattern arrangement of a display region that is a comparison example of the pattern arrangement of FIG. 5.
Figure 21:
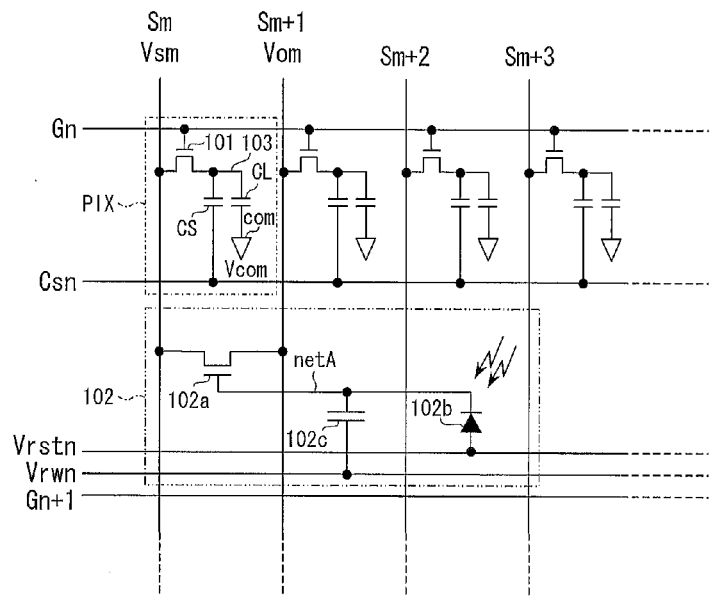
FIG. 21 shows a conventional technique, and is a circuit diagram showing a configuration of a display region in which an optical sensor type touch sensor is provided.
Figure 22:
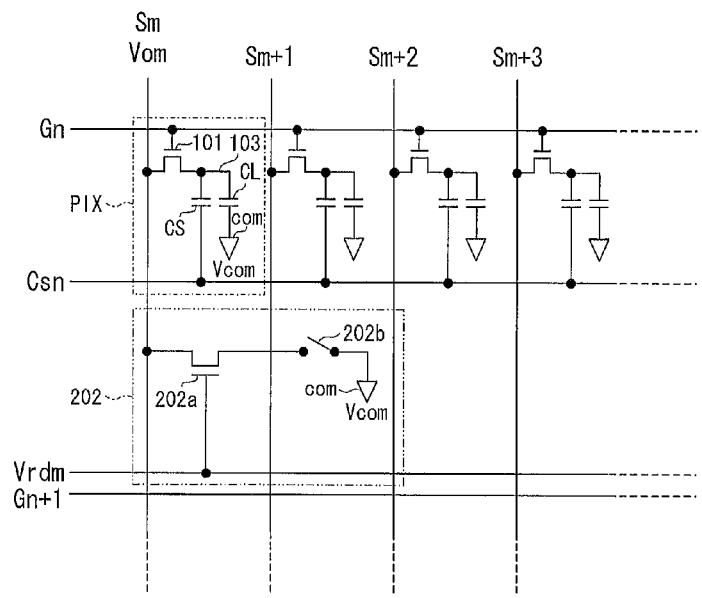
FIG. 22 shows a conventional technique, and is a circuit diagram showing a configuration of a display region in which a contact point type touch sensor is provided.
Figure 23:
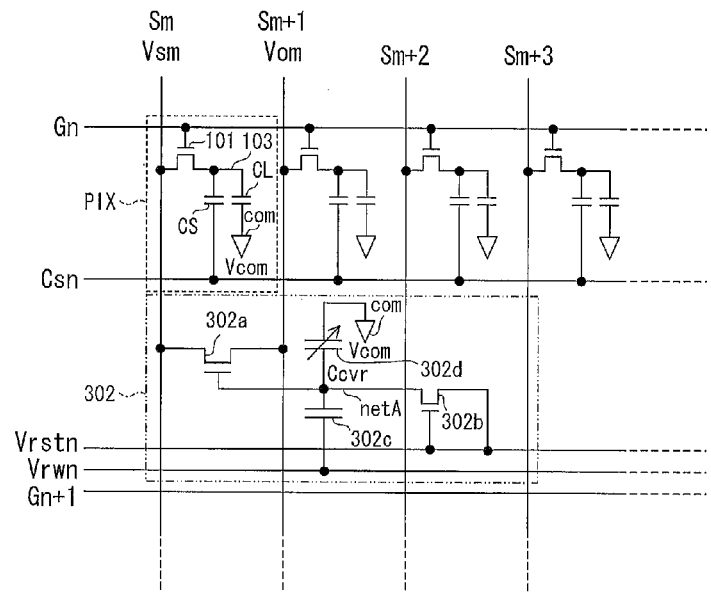
FIG. 23 shows a conventional technique, and is a circuit diagram showing a configuration of a display region in which a capacitance type touch sensor is provided.
Figure 24:
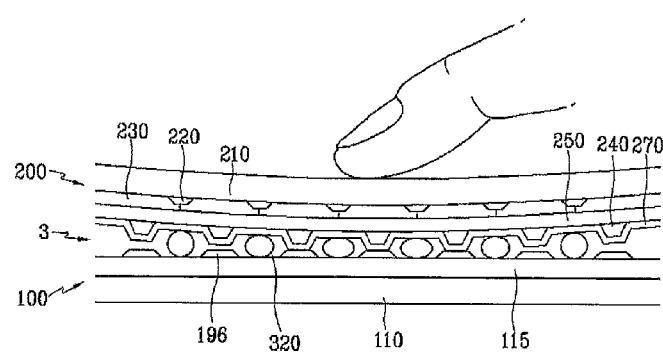
FIG. 24 shows a conventional technique, and is a cross-sectional view showing a configuration of a display device in which a contact point type touch sensor is provided.

FIG. 6 comparatively shows a plain view of a display region including a sensor circuit 102 of FIG. 21 described in Background Art. As shown in FIG. 6, a light-shielding film BM is provided over a broad region where an output amplifier 102a and a capacitor 102c are provided, so as to prevent malfunctions of the sensor circuit 102, which are caused by extra light irradiation.

Meanwhile, the touch sensor circuit 62 of FIG. 5 occupies less surface area of the display region. It is therefore possible to prevent the aperture ratio of the display region from being reduced by the light-shielding film 2b.

Figure 10:
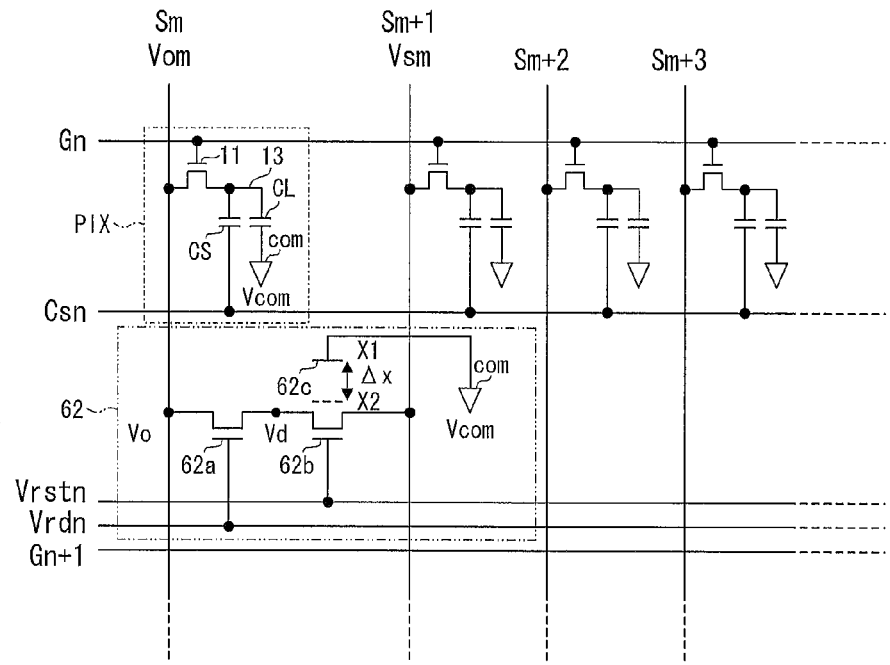
FIG. 10 is a circuit diagram showing a touch sensor circuit in which a sensor power supply wiring serves also as a source wiring.

FIG. 10 comparatively shows a circuit diagram of the touch sensor circuit 62 in which the sensor power supply wiring Vsm serves also as the source wiring Sm+1. In FIG. 10, the sensor power supply wiring Vsm serves also as the source wiring Sm+1, and the TFT 62b has a drain connected to the sensor power supply wiring Vsm that serves also as the sensor wiring Sm+1. The touch sensor circuit 62 of FIG. 10 employs two wirings of (i) the sensor output wiring Vom that serves also as the source wiring Sm and (ii) the sensor power supply wiring Vsm that serves also as the source wiring Sm+1.

The touch sensor circuit 62 of FIG. 2 employs merely the sensor output wiring Vom that serves also as the source wiring Sm. Therefore, wirings and circuits of FIG. 2 can be configured more simply than those of FIG. 10.

Figure 11:
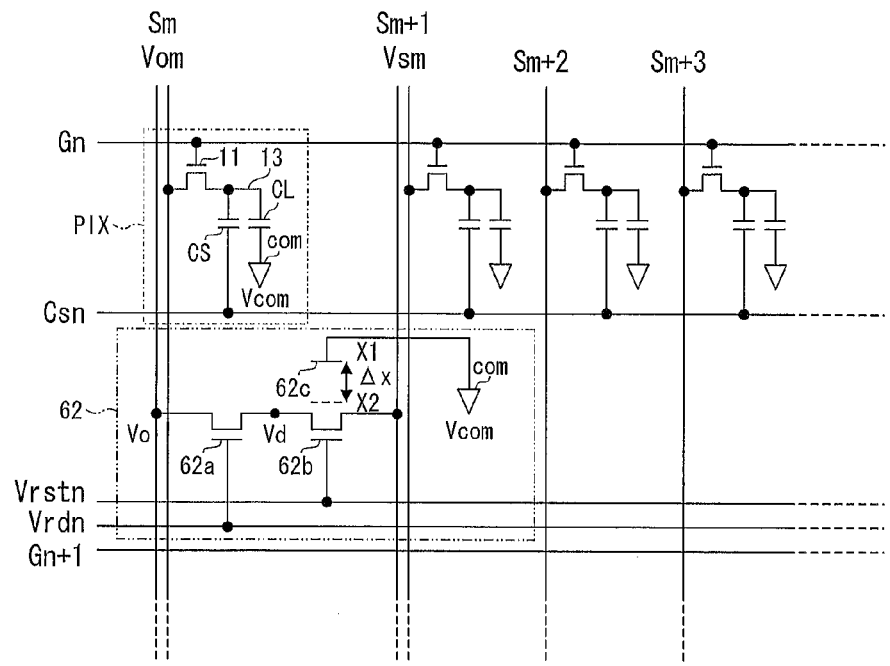
FIG. 11 is a circuit diagram showing a touch sensor circuit in which a sensor power supply wiring is provided separately from a source wiring.

FIG. 11 comparatively shows a circuit diagram of the touch sensor circuit 62 in which the sensor power supply wiring Vsm is provided separately from the source wiring Sm+1. In FIG. 11, the sensor power supply wiring Vsm is provided separately from the source wiring Sm+1, and the TFT 62b has a drain connected to the sensor power supply wiring Vsm provided separately from the source wiring Sm+1. The touch sensor circuit 62 of FIG. 10 employs two wirings of (i) the sensor output wiring Vom provided separately from the source wiring Sm and (ii) the sensor power supply wiring Vsm provided separately from the source wiring Sm+1.

The touch sensor circuit 62 of FIG. 4 employs merely the sensor output wiring Vom provided separately from the source wiring Sm. Therefore, wirings and circuits of FIG. 4 can be configured more simply than those of FIG. 11. Further, in the touch sensor circuit 62 of FIG. 4, a wiring which is a component of the touch sensor circuit 62 and which is provided parallel to the source wiring S is merely the sensor output wiring Vom provided separately from the source wiring Sm. This makes it possible to minimize reduction in aperture ratio.

Example 2

The following description will discuss another example of the present invention with reference to FIGS. 12 through 20. Note that configurations other than what is described in Example 2 are identical to those of Example 1. Further, for the sake of easy explanation, like reference numerals herein refer to corresponding members having like functions in the drawings of Example 1, and descriptions of such members are omitted here.

FIG. 9 shows a configuration of a liquid crystal display device 80 of Example 2. The liquid crystal display device 80 is a liquid crystal display device including a touch sensor circuit 82 that is substituted for the touch sensor circuit 62 provided in the display region of the display panel 51 of the liquid crystal display device 50 of Example 1.

Figure 13:
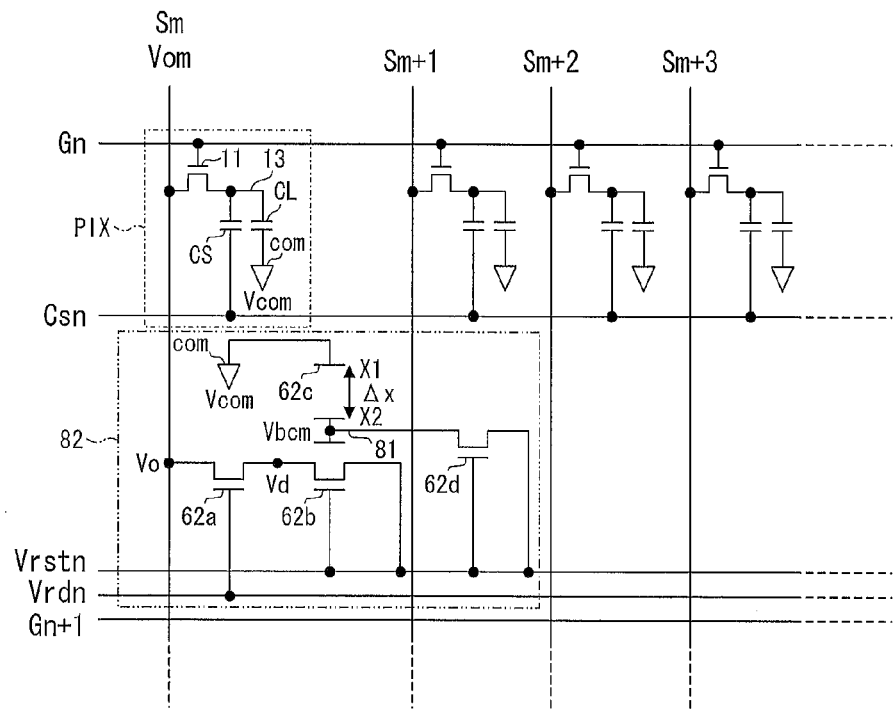
FIG. 13 shows another example of the present invention, and is a circuit diagram showing a configuration of a display region of a display device.

FIG. 13 shows a detailed configuration of a display region.

FIG. 13 specifically shows a configuration of the n-th line of the display region. In the n-th line are provided (i) a plurality picture elements PIX defined by a gate wiring Gn, source wirings S (Sm through Sm+3 of FIG. 13), and a retention capacitor wiring Csn and (ii) at least one touch sensor circuit 82 connected to a reset wiring (first wiring) Vrstn and a readout control wiring Vrdn that serve as different types of sensor scanning signal lines E (see FIG. 9). The retention capacitor wiring Csn, the reset wiring Vrstn, and the readout control wiring Vrdn are provided so as to be parallel to the gate wiring Gn.

Each of the picture elements PIX includes a TFT 11 serving as a selection element, a liquid crystal capacitor CL, and a retention capacitor CS. The TFT 11 has a gate connected to the gate wiring Gn, a source connected to corresponding one of the source wirings S, and a drain connected to a picture element electrode 13. The liquid crystal capacitor CL is a capacitor formed by the picture element electrode 13 and a common electrode com having a liquid crystal layer therebetween. The retention capacitor CS is a capacitor formed by the picture element electrode 13 or a drain electrode of the TFT 11, and the retention capacitor wiring Csn having provided an electrically insulating film therebetween. The common electrode com and the retention capacitor wiring Csn receive, for example, a constant voltage.

The number of the touch sensor circuit 82 to be provided in the display region is optional. For example, the touch sensor circuit 82 is provided for each of the plurality of picture elements PIX or for each of pixels (for example, for each of sets of R, G and B picture elements PIX). The touch sensor circuit 82 includes a first circuit in which TFTs 62a, 62b and 62d, and an electrode 62c are provided. In Example 2, the first circuit itself constitutes the touch sensor circuit 82. The TFT (switch) 62a has a gate terminal connected to the readout control wiring Vrdn, one of drain/source terminals which is connected to the source wiring Sm that is one of the source wirings S, that is, to a sensor output wiring Vo, and the other of the drain/source terminals which is connected to a source of the TFT 62b. The TFT 62b has a gate terminal and a drain terminal (a first drain/source terminal) that are connected to the reset wiring Vrstn, and a source terminal (a second drain/source terminal) connected to the other of the drain/source terminals of the TFT 62a. The TFT 62d (reset transistor) has a gate terminal and a drain terminal (one of drain/source terminals) that are connected to the reset wiring Vrstn, and a source terminal (the other of the drain/source terminals) connected to a back channel reset electrode (reset electrode) 81.

The back channel reset electrode 81 is provided in a back channel side of the TFT 62b so as to be separated from the TFT 62b. The electrode (first electrode) 62c that sandwiches the back channel reset electrode 81 with the TFT 62b functions as a back gate electrode of the TFT 62b. The electrode 62c is connected to the common electrode com. As is clear from the following description, the TFT 62b utilizes a general effect of an electric field transistor. Note that leak current is great particularly in a TFT.

Further, elements other than the above-described elements can be provided in the touch sensor circuit 82.

During a period other than a period during which data signals are written in the picture elements PIX, for example, during a horizontal flyback period, the touch sensor circuit 82 of FIG. 13 (i) controls whether to switch on the TFT 62b according to whether or not a shift Δx of the electrode 62c is caused by a pressure applied to a counter substrate, and (ii) causes the TFT 62a to supply a sensor output signal Vo to a sensor output wiring Vom. The sensor reading circuit 55 detects, from the sensor output signal Vo supplied via the sensor output wiring Vom, whether or not a pressure is applied to a display surface.

Figure 14:
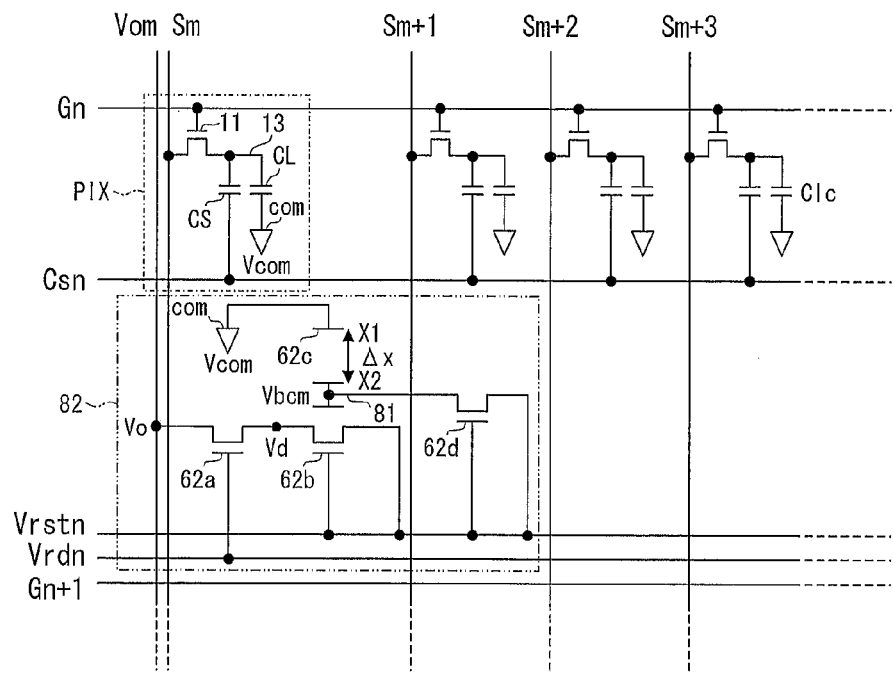
FIG. 14 is a circuit diagram showing a configuration of a modified example of the touch sensor circuit of FIG. 12.

The touch sensor circuit 82 can have a configuration shown in FIG. 14.

In FIG. 14, a sensor output wiring Vom is a wiring other than source wirings S. A TFT 62a has a first drain/source terminal connected to the sensor output wiring Vom. A TFT 62b has a first drain/source terminal connected to a reset wiring Vrstn.

Figure 12:
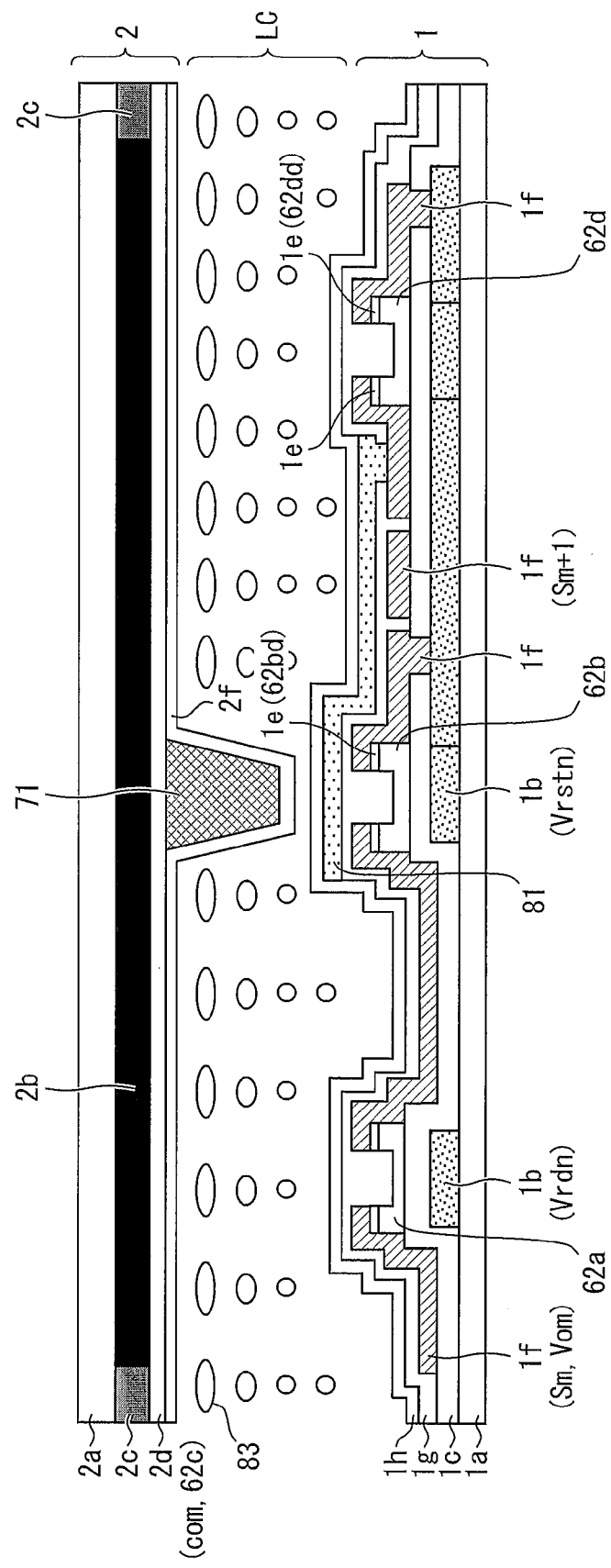
FIG. 12 shows another example of the present invention, and is a cross-sectional view showing a configuration of a touch sensor circuit provided in a display device.
Figure 15:
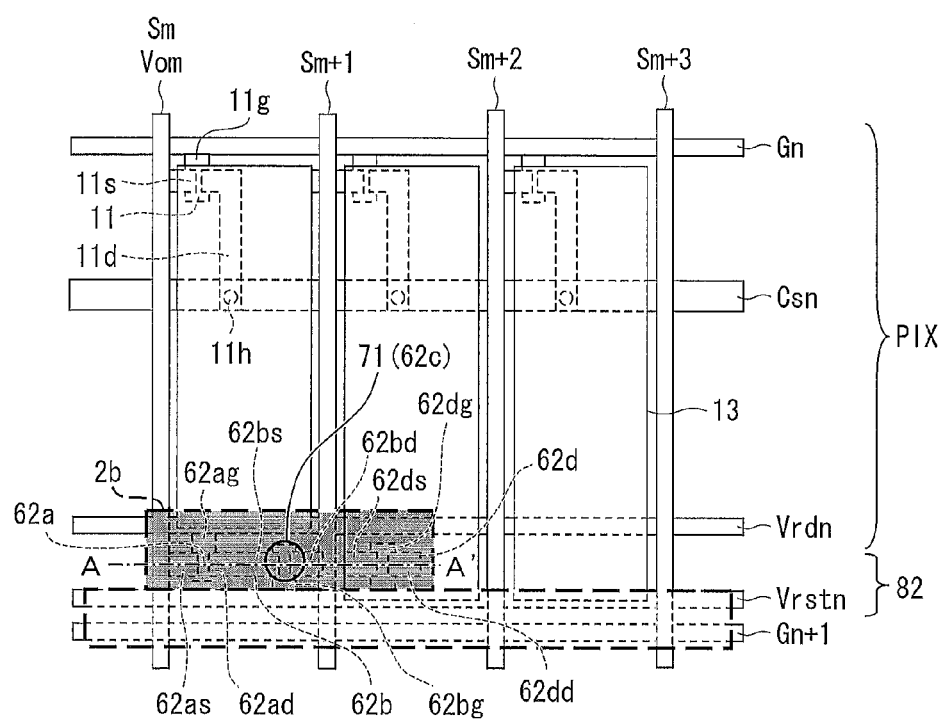
FIG. 15 is a plain view showing a pattern arrangement of the display region of FIG. 13.

FIG. 15 is a plain view of the touch sensor circuit 82 of FIG. 13. FIG. 12 is a cross-sectional view taken along A-A' line of FIG. 15.

As shown in FIG. 15, in the picture element PIX, the TFT 11 has a gate 11g connected to the gate wiring Gn, a source 11s connected to corresponding one of the source wirings S (Sm, Sm+1 and Sm+2), and a drain 11d connected to the picture element electrode 13 via a contact hole 11h formed on an upper surface of the retention capacitor wiring Csn. Further, the retention capacitor CS is formed by the drain 11d and the retention capacitor wiring Csn.

In the touch sensor circuit 82, the TFT 62a has the gate terminal connected to the readout control wiring Vrdn, a drain/source terminal 62as connected to the sensor output wiring Vom, and a drain/source terminal 62ad connected to a source terminal 62bs of the TFT 62b. The TFT 62b has a gate terminal 62bg and a drain terminal 62bd each of which is connected to the reset wiring Vrstn. The TFT 62d has a gate terminal 62dg and a drain terminal 62dd each of which is connected to the reset wiring Vrstn. The TFT 62d has a source terminal 62ds connected to the back channel reset electrode 81 shown in FIG. 12.

A pillar projection 71 is provided on the electrode 62c above the TFT 62b. A light-shielding film (black matrix) 2b is provided in a region where the TFTs 62a, 62b and 62d are provided, so that light from a display surface side is shielded.

FIG. 12 shows a cross-sectional configuration of a region where the touch sensor circuit 82 is provided. In the region, a liquid crystal layer LC is provided between a TFT substrate 1 and a counter substrate 2, as with a region where the picture element PIX is provided. In the liquid crystal layer LC, liquid crystal molecules 83 are aligned in a direction defined by liquid crystal alignment films 1h and 2f (later described).

The TFT substrate (second substrate) 1 is configured by forming an electrically insulating substrate 1a, a gate metal 1b, a gate insulating film 1c, an i layer 1d of Si, an $n^+$ layer 1e of Si, a source metal 1f, a passivation film 1g, the back channel reset electrode 81, and the liquid crystal alignment film 1h in this order. The readout control wiring Vrdn and the reset wiring Vrstn are constituted by the gate metal 1b, as with the gate wiring Gn and the retention capacitor wiring Csn. The source wiring Sm (the sensor output wiring Vom) and the source wiring Sm+1 are constituted by the source metal 1f. An $n^+$ layer 1e that corresponds to the drain terminal 62bd of the TFT 62b, and an $n^+$ layer 1e that corresponds to the drain terminal 62dd of the TFT 62d are connected to the reset wiring Vrstn via the source metal 1f. The liquid crystal alignment film 1h is made from, for example, polyimide.

The counter substrate (first substrate) 2 is configured by forming an electrically insulating substrate 2a, the light-shielding film 2b and a color filter 2c, a transparent electrode 2d, the pillar projection 71, and the liquid crystal alignment film 2f in this order. The transparent electrode 2d constitutes the common electrode com. In Example 2, the electrode 62c is constituted by the common electrode com itself, and therefore the electrode 62c is not distinguished from the common electrode com. That is, generally, the electrode 62c is being connected to the common electrode com.

The pillar projection 71 is made from a dielectric, and is provided on the common electrode 2d so as to project from the back channel side of the TFT 62b of the counter substrate 2 toward the TFT substrate 1. The alignment film 2f provided in an edge side of the pillar projection 71 is separated from the TFT substrate 1 while a user's finger or the like applies no pressure to the counter substrate 2. The alignment film 2f is movable to be in contact with the TFT substrate 1 in response to a pressure applied to the counter substrate 2 by a user's finger or the like. In FIGS. 13 and 14, Δx represents a shift of the counter substrate 2 caused by the pressure. The counter substrate 2 is located at X1 while no pressure is being applied to the counter substrate 2. The counter substrate 2 moves in response to the pressure applied to the counter substrate 2, and then stops at X2.

Figure 17:
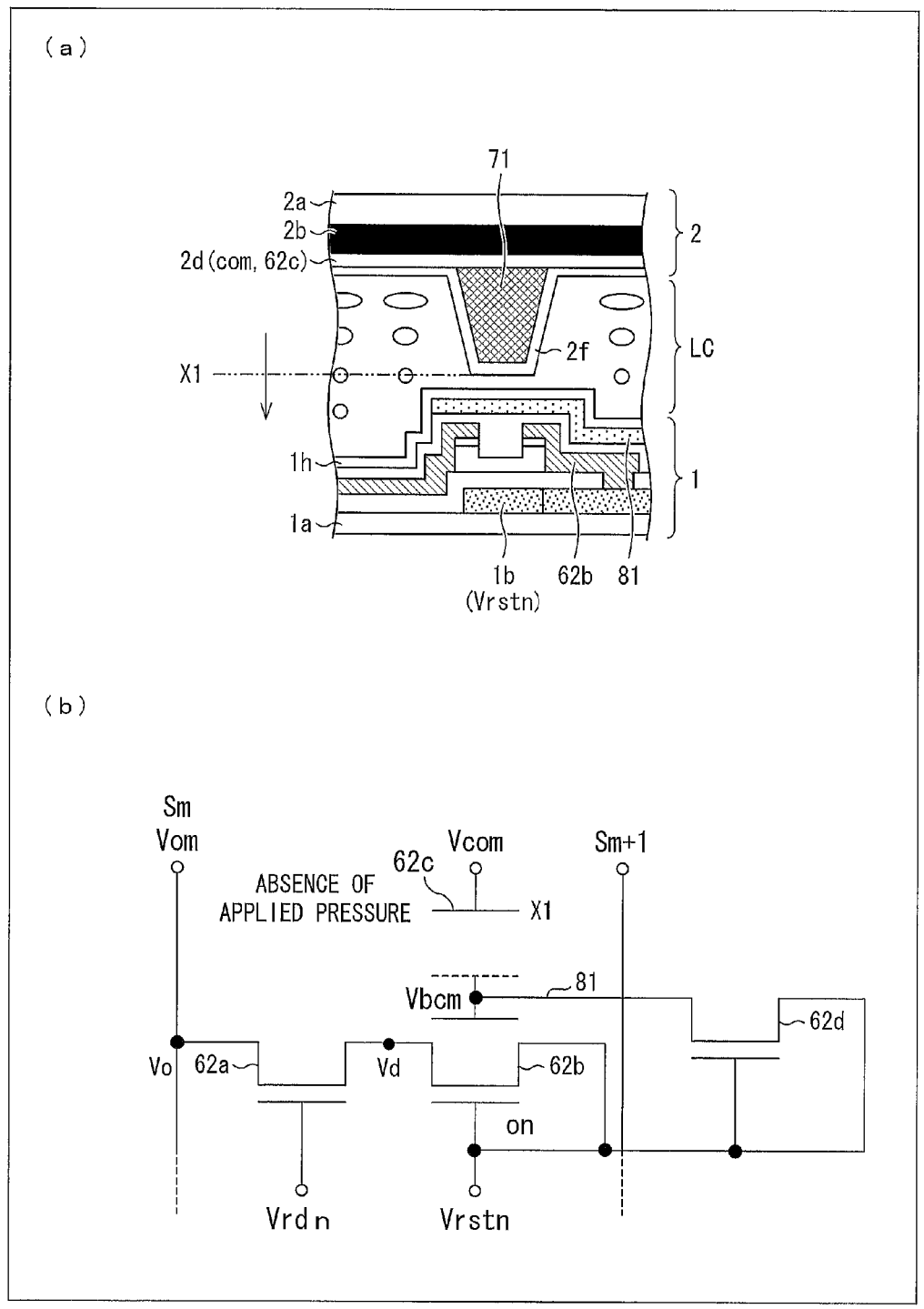
FIG. 17 is an explanatory view of the operation of the touch sensor circuit of FIG. 12.
Figure 18:
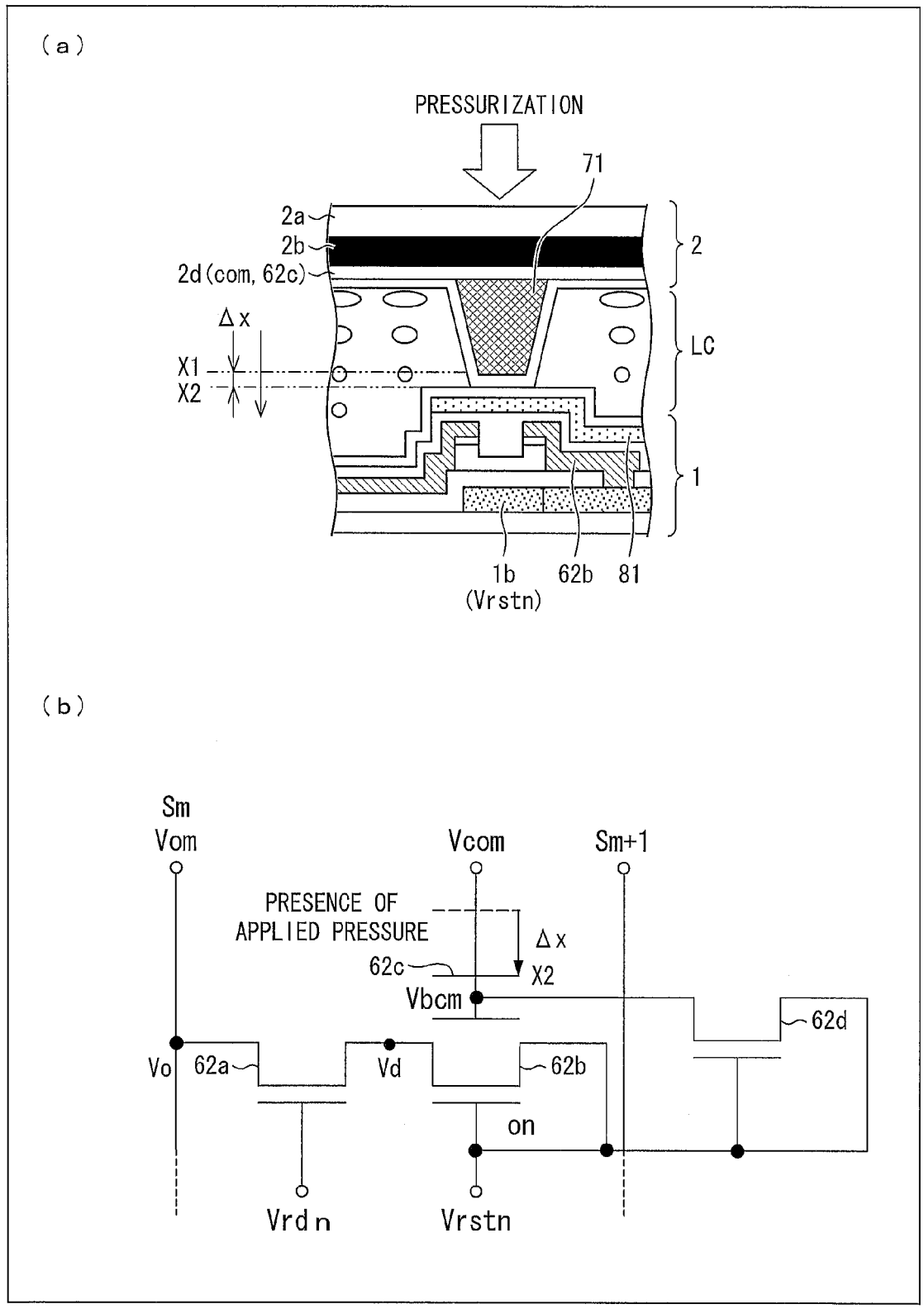
FIG. 18 is an explanatory view of the operation of the touch sensor circuit of FIG. 12.

The following description will discuss an operation of the touch sensor circuit 82 with reference to FIGS. 16 through 18. Each of FIGS. 17 and 18 is an explanatory view of the operation of the touch sensor circuit 82.

As shown in a waveform diagram of FIG. 16, the touch sensor circuits 82 provided in one of lines are driven by (i) positive reset pulses of High −4 V and Low −14 V applied to the reset wiring Vrstn and (ii) positive readout pulses of High +15 V and Low −14 V applied to the readout control wiring Vrdn. The positive reset pulses and the positive readout pulses are applied during a vertical period (1V). The readout pulse of High +15 V is applied in a predetermined period of time after the reset pulse of High −4 V is applied. In a case where the sensor output wiring Vom is employed for detection of a corresponding pressurized region of a screen, a series of operations from a start of application of the reset pulse to an end of application of the readout pulse should be carried out during a flyback period of a vertical period without scanning of the lines. Alternatively, the series of operations from a start of application of the reset pulse to an end of application of the readout pulse can be carried out during a period of each of horizontal periods, which period is other than a period during which image signals are written, while the lines are being scanned. In this case, it is possible to detect pressures applied to a plurality of corresponding pressurized regions of a screen provided that the sensor output wiring Vom for use in detection of the plurality of corresponding pressurized regions is present. Alternatively, each of the lines is scanned during each of flyback periods of a vertical period, so that a pressure applied to at least one pressurized region can be detected during a certain period of time.

The TFT 62b has a back channel covered with a passivation film of, for example, SiNx having a thickness of several thousands of angstrom. It is, however, possible to carry leak current to the back channel by a back gate effect caused by a voltage applied to the electrode 62c. In Example 2, quantity of the leak current, that is, magnitude of the back gate effect is controlled by an interval between the electrode 62c and the back channel reset electrode 81.

While no pressure is being applied to a display surface of the counter substrate 2, the electrode 62c is located at X1, and the alignment film 2f provided in the edge side of the pillar projection 71 is separated from the TFT substrate 1, specifically, from the alignment film 1h (see FIG. 17(a)), even in a case where a reset pulse is applied to the reset wiring Vrstn. Therefore, as shown in FIG. 17(b), the back gate effect caused by the voltage applied to the electrode 62c is small, and leak current is not carried to the back channel even in a case where the TFT 62b is being switched off. This allows the TFT 62b to be sufficiently being switched off. Therefore, as shown in FIG. 16, a back channel reset voltage Vbcm of the back channel reset electrode 81 remains −4 V that is an initial value even after the reset pulse is applied. Since no pressure is applied, the voltage Vd of the source of the TFT 62b, which voltage Vd is obtained after (i) execution of a reset for switching on the TFT 62b by a reset pulse of the reset wiring Vrstn, which reset pulse is applied to the gate terminal of the TFT 62b and (ii) execution of a reset for switching on the TFT 62d on by a reset pulse of the reset wiring Vrstn, which reset pulse is applied to the gate terminal of the TFT 62d, does not change from a voltage Vd of the source of the TFT 62b, which voltage Vd is obtained prior to the reset. Therefore, in a case where the TFT 62a is switched on by the readout pulse applied after the reset pulse is applied, the voltage Vd of the source of the TFT 62b, which voltage Vd is provided from the sensor output wiring Vom, that is, a sensor output voltage Vo remains −4 V without having changed since before the reset. It is therefore possible to detect absence of an applied pressure.

In contrast, while a pressure is being applied to the display surface of the counter substrate 2, the electrode 62c shifts by Δx from X1 to X2 in response to a reset pulse applied to the reset wiring Vrstn, so that the alignment film 2f provided in the edge side of the pillar projection 71 comes in contact with the TFT substrate 1, specifically, with the alignment film 1h (see FIG. 18(a)). Therefore, as shown in FIG. 18(b), the back gate effect caused by the voltage applied to the electrode 62c is increased, and leak current is carried to the back channel of the TFT 62b. This increases the back channel reset voltage Vbcm of the back channel reset electrode 81 after the reset pulse is applied (see FIG. 16). This also reduces the voltage Vd of the source of the TFT 62b after the reset pulse is applied (see FIG. 16). That is, an absolute value is increased. Increase in the back channel reset voltage Vbcm, and reduction in the voltage Vd change depending on Δx. However, in Example 2, the back channel reset voltage Vbcm and the voltage Vd always reach constant voltage values because the electrode 62c shifts in response to the pressure thus applied, and then stops at X2. As described above, the voltage Vd of the source of the TFT 62b, which voltage Vd is obtained after the reset, is changed by the pressure thus applied. Therefore, in a case where the TFT 62b is sufficiently being switched off, that is, the voltage Vd of the source of the TFT 62b reaches the constant voltage value, and then the TFT 62a is switched on by a readout pulse applied in a predetermined period of time, the voltage Vd of the source of the TFT 62b has been changed by the pressure thus applied, and the voltage Vd of the source of the TFT 62b, which voltage Vd is provided from the sensor output wiring Vom, that is, the sensor output voltage Vo becomes −14 V. It is therefore possible to detect presence of the pressure thus applied.

As such, it is possible to detect whether or not a pressure is applied to the display surface by detecting the sensor output voltage Vo whose polarity is negative by use of the sensor readout circuit 55.

During a period during which image data is written, the source wiring Sm of FIG. 13 receives an image signal, and has a given voltage corresponding to the image signal.

According to the configuration of the touch sensor circuit 82, it is possible to obtain a detection signal corresponding to whether or not a pressure is applied to the display surface, even in a case where the electrode 62c is not in electrical contact with the TFT substrate 1 in response to an applied pressure. In other words, an applied pressure can be detected without a movable electric point. This makes it unnecessary to apply a strong pressure to the display surface, thereby preventing film separation in the touch sensor circuit 82. Hence, a touch sensor circuit excellent in durability can be obtained.

Meanwhile, in the touch sensor circuit 62 of Example 1 including no back channel reset electrode 81, a Vcom electric potential is applied to a back gate of the TFT 62b via the alignment film 1h and the passivation film 1g when the pillar projection 71 comes in contact with the back channel during detection of an applied pressure. This generates leak current in the back channel. In a case where the Vcom electric potential is applied for a long time or continuously, a material itself for the alignment film 1h polarizes, or impurity ions contained in a liquid crystal material or in the alignment film are absorbed to the alignment film 1h or the passivation film 1g. This may possibly cause the back gate of the TFT 62b to be charged up and to be always being switched on, thereby causing malfunctions of the touch sensor circuit 62.

In contrast, the touch sensor circuit 82 includes the back channel reset electrode 81 connected to the source of the TFT 62d. The touch sensor circuit 82 is configured such that the back channel reset voltage Vbcm, that is, a voltage of the back channel reset electrode 81 (the voltage of the source of the TFT 62d) is reset to an off-electric potential, simultaneously when the voltage Vd of the source of the TFT 62b is reset. With this, an electric potential of the back channel of the TFT 62b is made to be an off-electric potential at constant intervals (for example, one horizontal scanning period), whereby charging up of electric charges of the alignment film 1h or the passivation film 1g is reset. In this manner, malfunctions of the touch sensor circuit 82 can be prevented.

The back channel reset voltage Vbcm is reset by the TFT 62b. It is more preferable that (i) a wiring region be reduced by connection of the gate and the drain of the TFT 62d, and the gate and the drain of the TFT 62b to an identical reset wiring Vrstn and (ii) electric potentials of the source electrodes of the TFTs 62d and 62b be controlled.

Further, malfunctions are not caused under a high luminous intensity environment and a low luminous intensity environment, unlike an optical sensor circuit. This is because an optical sensor is not employed for detection of an applied pressure. Furthermore, unlike a capacitance type touch sensor, malfunctions are unlikely to be caused by an external factor such as temperature change or static electricity. It is therefore possible to carry out a detection excellent in S/N ratio.

The TFT 62b connected to the reset wiring Vrstn of the touch sensor circuit 82 has an electric potential of −14 V while being in an off state. An absolute value of the electric potential is 14 V. The absolute value of 14 V is greater than 12 V that is an absolute value of an electric potential of +12 V obtained in a case where the source wiring Sm+1 also serves as the sensor power supply wiring Vsm during dot inversion driving of the liquid crystal display device 80. The absolute value of 14 V is also greater than 6 V that is an absolute value of an electric potential of +6 V obtained in a case where the source wiring Sm+1 also serves as the sensor power supply wiring Vsm during line inversion driving of the liquid crystal display device 80. It is therefore possible to carry out a detection excellent in S/N ratio.

In this manner, it is possible to provide a display device including a non-contact type touch sensor having a preferable property, which can be substituted for a contact point type touch sensor.

Further, electric current that flows through the TFT 62b can be set to great electric current. It is therefore possible to reduce element sizes of the TFT 62b and the TFT 62a. This allows reduction in voltage for creation of a detection signal, and increase in aperture ratio of a display region.

Further, unlike the optical sensor circuit, great capacitance for rise in pressure is not required. This makes it possible to simplify a process, and increase the aperture ratio of the display region.

In the touch sensor circuit 82, the electrode 62c is connected to the common electrode com. It is therefore possible to easily configure the electrode 62c that is shifted with the counter substrate 2 by an applied pressure. It is also possible to simultaneously form the electrode 62c and the common electrode com. This simplifies a process for forming them. Further, the common voltage Vcom can be used as a voltage to be applied to the electrode 62c. This can simplify the touch sensor circuit 82.

The touch sensor circuit 82 includes the pillar projection 71, made from a dielectric, which is provided on the electrode 62c. This makes it easy to cause the electrode 62c to function as the back gate of the TFT 62b even in a case where an inclusion such as the liquid crystal LC, or a space is provided between the TFT substrate 1 and the counter substrate 2. It is therefore possible to enhance a sensitivity at which an applied pressure is detected. The pillar projection 71 can be a pillar projection made from an electric conductor, or a pillar projection made from a dielectric body covered with an electric conductor, other than the pillar projection made from the dielectric.

The edge side of the pillar projection 71 is separated from the TFT substrate 1 while no pressure is being applied to the counter substrate 2. The edge side of the pillar projection 71 can move to be in contact with the TFT substrate 1 in response to a pressure applied to the counter substrate 2. It is therefore possible to stably realize (i) a non-pressurized state in which the pillar projection 71 does not positionally change and (ii) a pressurized state in which the edge side of the pillar projection 71 stops moving when coming in contact with the TFT substrate 1. This unlikely causes malfunctions in detection of an applied pressure.

The touch sensor circuit 82 is provided in the display region. It is therefore possible to provide a plurality of touch sensor circuits 82 in a display matrix. This also makes it possible to deal with multipoint input that is strongly required, by utilization of a property of less occurrence of malfunctions.

In the touch sensor circuit 82 of FIG. 13, the sensor output wiring Vom is the source wiring S. The source wiring S serves as the sensor output wiring Vom during a period other than a period during which data is written in picture elements PIX. This allows reduction in the number of wirings, thereby increasing the aperture ratio of the display region.

Meanwhile, in the touch sensor circuit 82 of FIG. 14, the sensor output wiring Vom is a wiring other than the source wiring S. This configuration makes it possible to employ the sensor output wiring Vom for driving of the touch sensor circuit 82 regardless of whether to be during the period during which data is written in picture elements PIX. It is therefore possible to detect an applied pressure at a timing excellent in flexibility.

The touch sensor circuit 82 includes the liquid crystal layer LC provided between that region of the counter substrate 2 in which the electrode 62*c* is provided and that region of the TFT substrate 1 in which the TFT 62*b* is provided. This configuration makes it possible to employ, for configuration of a region of the touch sensor circuit 82, the liquid crystal layer LC itself for creation of picture elements PIX, in the liquid crystal display device 80.

The touch sensor circuit 82 includes the liquid crystal alignment film (1*h*, 2*f*) provided on at least either that region of the counter substrate 2 in which the electrode 62*c* is provided or that region of the TFT substrate 1 in which the TFT 62*b* is provided. This configuration makes it possible to employ, for the region of the touch sensor circuit 82, the alignment film itself for creation of picture elements PIX, without damaging the alignment film.

The touch sensor circuit 82 of FIG. 15 includes the light-shielding film 2*b*. This can favorably prevent the touch sensor circuit 82 from being erroneously operated due to external light, thereby improving stability in detection of an applied pressure.

FIG. 6 comparatively shows a plain view of a display region including a sensor circuit 102 of FIG. 21 described in Background Art. As shown in FIG. 6, a light-shielding film BM is provided over a broad region where an output amplifier 102*a* and a capacitor 102*c* are provided, so as to prevent malfunctions of the sensor circuit 102, which are caused by extra light irradiation.

Meanwhile, the touch sensor circuit 82 of FIG. 15 occupies less surface area of the display region. It is therefore possible to prevent the aperture ratio of the display region from being reduced by the light-shielding film 2*b*.

Figure 19:
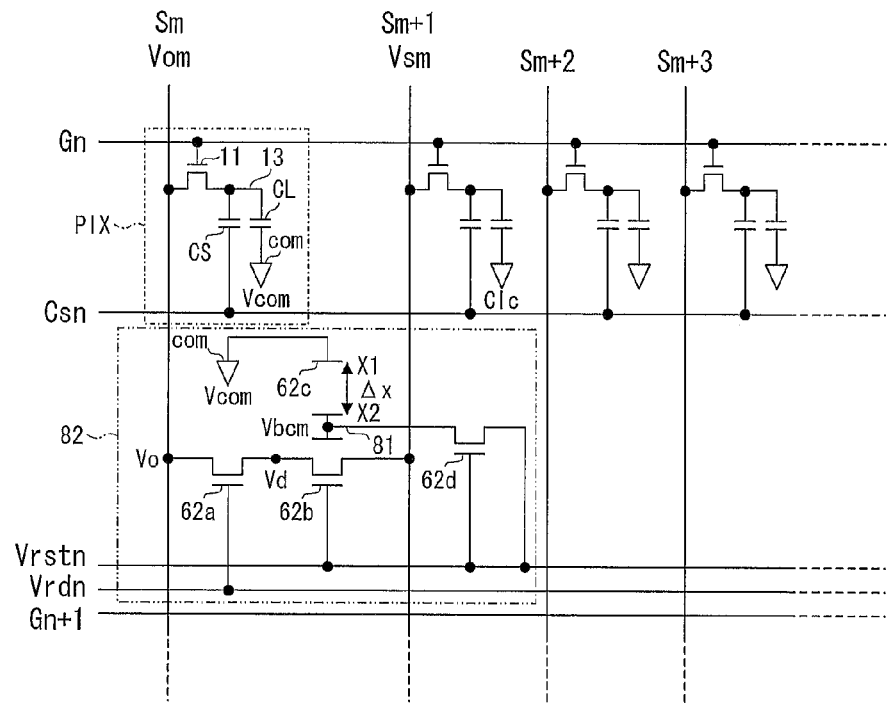
FIG. 19 is a circuit diagram showing a touch sensor circuit in which a sensor power supply wiring serves also as a source wiring.

FIG. 19 comparatively shows a circuit diagram of the touch sensor circuit 82 in which the sensor power supply wiring Vsm serves also as the source wiring Sm+1. In FIG. 19, the sensor power supply wiring Vsm serves also as the source wiring Sm+1, and the TFT 62*b* has a drain connected to the sensor power supply wiring Vsm that serves also as the sensor wiring Sm+1. The touch sensor circuit 82 of FIG. 19 employs two wirings of (i) the sensor output wiring Vom that serves also as the source wiring Sm and (ii) the sensor power supply wiring Vsm that serves also as the source wiring Sm+1.

The touch sensor circuit 82 of FIG. 13 employs merely the sensor output wiring Vom that serves also as the source wiring Sm. Therefore, wirings and circuits of FIG. 13 can be configured more simply than those of FIG. 19.

Figure 20:
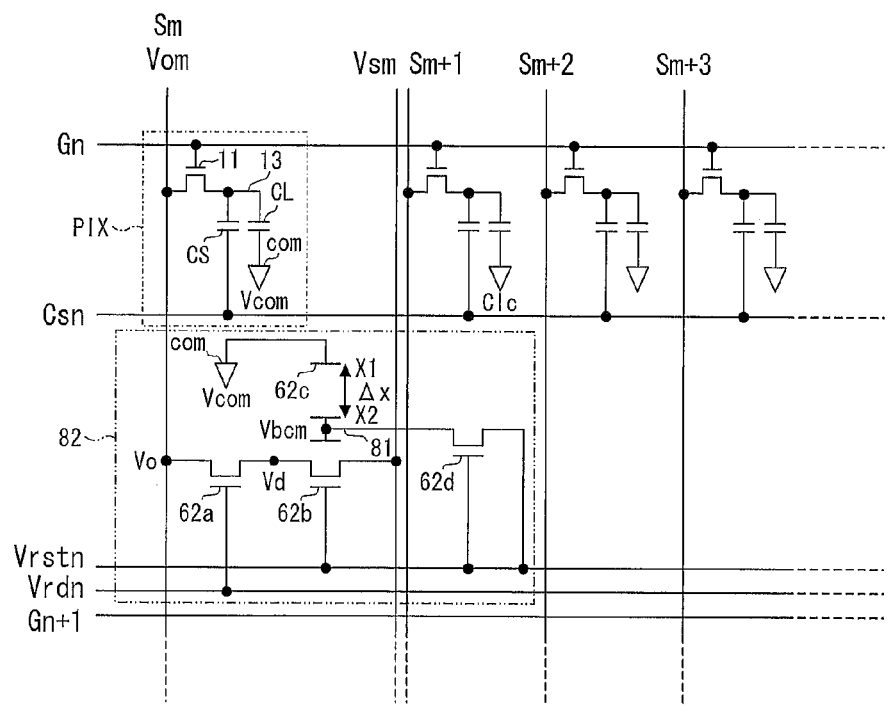
FIG. 20 is a circuit diagram showing a touch sensor circuit in which a sensor power supply wiring is provided separately from a source wiring.

FIG. 20 comparatively shows a circuit diagram of the touch sensor circuit 82 in which the sensor power supply wiring Vsm is provided separately from the source wiring Sm+1. In FIG. 20, the sensor power supply wiring Vsm is provided separately from the sensor wiring Sm+1, and the TFT 62*b* has a drain connected to the sensor power supply wiring Vsm provided separately from the source wiring Sm+1. The touch sensor circuit 82 of FIG. 20 employs two wirings of (i) the sensor output wiring Vom provided separately from the source wiring Sm and (ii) the sensor power supply wiring Vsm provided separately from the source wiring Sm+1.

Meanwhile, the touch sensor circuit 82 of FIG. 14 employs merely the sensor output wiring Vom provided separately from the source wiring Sm. Therefore, wirings and circuits of FIG. 14 can be configured more simply than those of FIG. 20. Further, in the touch sensor circuit 82 of FIG. 14, a wiring which is a component of the touch sensor circuit 82 and which is provided parallel to the source wiring S is merely the sensor output wiring Vom provided separately from the source wiring Sm. This makes it possible to minimize reduction in aperture ratio.

Summary of Embodiment

The touch sensor circuit 82 of the liquid crystal display device 80 of the present embodiment includes the back channel reset electrode 81, and the TFT 62*d* for resetting the back channel reset electrode 81. The back channel reset electrode 81 and the TFT 62*d* are provided on the TFT substrate 1. The TFT 62*d* has (i) the gate terminal 62*dg* and the drain terminal 62*dd*, each of which is connected to the reset wiring Vrstn and (ii) the source terminal 62*ds* connected to the back channel reset electrode 81. The back channel reset electrode 81 is provided between the TFT 62*b* and the electrode 62*c*. Resetting of the back channel reset electrode 81 is to switch on the TFT 62*d* by applying, to the gate terminal dg of the TFT 62*d*, the voltage Vrst of the reset wiring Vrstn.

According to the configuration, the gate terminal 62*bg* and the drain terminal 62*bd* of the TFT 62*b*, and the gate terminal 62*dg* and the drain terminal 62*dd* of the TFT 62*d* are connected to the reset wiring Vrstn.

Therefore, the voltage of the source of the TFT 62*b* becomes equal to the voltage of the back channel reset electrode 81. This does not cause charging up of electric charges of an electrically insulating film even in a case where the electrically insulating film is provided between the TFT 62*b* and the back channel reset electrode 81. It is therefore possible to prevent malfunctions of the touch sensor circuit 82 caused by the charging up.

In each of the liquid crystal display devices 50 and 80 in accordance with the present embodiment, the reset wiring Vrstn is provided for each of lines of picture elements PIX, to which reset wirings Vrstn the voltage Vrst is sequentially applied.

According to the configuration, the touch sensor circuits 62 or the touch sensor circuits 82 that are provided respectively for the plurality of picture elements PIX that are provided for each of the lines can be simultaneously driven. It is therefore possible to detect pressures simultaneously applied to a plurality of display regions of an identical line.

In each of the liquid crystal display devices 50 and 80 in accordance with the present embodiment, on the electrode 62*c* is provided the pillar projection 71 including a dielectric, an electric conductor, or a dielectric body covered with an electric conductor, and projecting toward the TFT substrate 1 from the back channel side of the TFT 62*b* provided on the counter substrate 2, such that the counter substrate 2 is not in contact with the TFT substrate 1 while no pressure is being applied to the counter substrate 2.

According to the configuration, the pillar projection 71 including the dielectric, the electric conductor, or the dielectric body covered with the electric conductor is provided. This makes it easy to cause the electrode 62c to function as the back gate of the TFT 62b even in a case where an inclusion or a space is provided between the TFT substrate 1 and the counter substrate 2. It is therefore possible to enhance a sensitivity at which an applied pressure is detected.

In each of the liquid crystal display devices 50 and 80 in accordance with the present embodiment, the pillar projection 71 has an edge that (i) is separated from the TFT substrate 1 while no pressure is being applied to the counter substrate 2 and (ii) is movable to be in contact with the TFT substrate 1 in response to a pressure applied to the counter substrate 2.

According to the configuration, the pillar projection 71 including the dielectric, the electric conductor, or the dielectric body covered with the electric conductor is provided. It is therefore possible to stably realize (i) a non-pressurized state in which the pillar projection 71 does not positionally change and (ii) a pressurized state in which the edge side of the pillar projection 71 stops moving when coming in contact with the TFT substrate 1. This unlikely causes malfunctions in detection of an applied pressure.

In each of the liquid crystal display devices 50 and 80 in accordance with the present embodiment, the touch sensor circuit 62 or 82 is provided in a display region.

According to the configuration, it is possible to provide a plurality of touch sensor circuits 62 or 82 in a display matrix. This also makes it possible to deal with multipoint input, by utilization of a property of less occurrence of malfunctions.

In the liquid crystal display device 50 in accordance with the present embodiment, the sensor output wiring Vom is the data signal line Sm.

According to the configuration, the data signal line Sm serves as the sensor output wiring Vom during a period other than a period during which data is written in picture elements PIX. This allows reduction in the number of wirings, thereby increasing the aperture ratio of the display region.

In the liquid crystal display device 80 in accordance with the present embodiment, the sensor output wiring Vom is a wiring other than the data signal line Sm.

According to the configuration, it is possible to employ the sensor output wiring Vom for driving of the touch sensor circuit 82 regardless of whether to be during the period during which data is written in picture elements PIX. It is therefore possible to detect an applied pressure at a timing excellent in flexibility.

Each of the liquid crystal display devices 50 and 80 in accordance with the present embodiment includes the liquid crystal layer LC provided between that region of the counter substrate 2 in which the electrode 62c is provided and that region of the TFT substrate 1 in which the TFT 62b is provided.

According to the configuration, it is possible to employ, for configuration of a region of the touch sensor circuit 62 or 82, the liquid crystal layer LC itself for creation of picture elements PIX, in the liquid crystal display device 50 or 80.

Each of the liquid crystal display devices 50 and 80 in accordance with the present embodiment includes the liquid crystal alignment film 1h or 2f provided on at least either that region of the counter substrate 2 in which the electrode 62c is provided or that region of the TFT substrate 1 in which the TFT 62b is provided.

According to the configuration, it is possible to employ, for the region of the touch sensor circuit 62 or 82, the alignment film 1h or 2f itself for creation of picture elements PIX, without damaging the alignment film 1h or 2f.

Each of the liquid crystal display devices 50 and 80 in accordance with the present embodiment includes the light-shielding film 2b for shielding the TFT 62b from light.

According to the configuration, the light-shielding film 2b is provided. This can favorably prevent the touch sensor circuit 62 or 82 from being erroneously operated due to external light, thereby improving stability in detection of an applied pressure. Further, each of the touch sensor circuits 62 and 82 occupies less surface area. It is therefore possible to prevent the aperture ratio of the display region from being reduced by the light-shielding film 2b.

The liquid crystal display device 50 or 80 in accordance with the present embodiment detects, on the basis of an output from the touch sensor circuit 62 or 82, which output is obtained via the sensor output wiring Vom while the TFT 62a is being closed, whether or not the voltage Vrst applied to the reset wiring Vrstn is applied to the sensor output wiring Vom via the TFT 62b, so that the liquid crystal display device 50 or 80 detects whether or not the counter substrate 2 is pressurized.

According to the configuration, it is possible to easily and reliably detect whether or not a pressure is applied.

The above description discussed the present embodiment.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is suitably applicable to various display devices such as a liquid crystal display device.

REFERENCE SIGNS LIST

1: TFT substrate (second substrate)
2: counter substrate (first substrate)
1h: alignment film
2b: light-shielding film
2f: alignment film
50 and 80: liquid crystal display device (display device)
51: display panel
62 and 82: touch sensor circuit (first circuit)
62a: TFT (switch)
62b: TFT (field effect transistor)
62d: TFT (reset transistor)
62bg: gate terminal
62bd: drain terminal (first drain/source terminal)
62bs: source terminal (second drain/source terminal)
62dg: gate terminal
62dd: drain terminal (one of drain/source terminals)
62ds: source terminal (the other of drain/source terminals)
62c: electrode (first electrode)
71: pillar projection
81: back channel reset electrode (reset electrode)
com: common electrode
LC: liquid crystal layer
Vbcm: back channel reset voltage
Vrstn: reset wiring (first wiring)
Vsm: sensor power supply wiring
Vom: sensor output wiring (second wiring)

The invention claimed is:

1. A display device, comprising:
picture element electrodes; and
a first circuit that includes:
 a first electrode,
 a field effect transistor, and
 a switch, wherein
the first electrode is provided on a first substrate including a display surface of a display panel, and connected to a common electrode such that the first electrode overlaps the field effect transistor without any portion of any of the picture element electrodes being located between the first electrode and the field effect transistor,
the field effect transistor is provided on a second substrate in such a manner that the first electrode is provided in a back channel side of the field effect transistor so as to be separated from the field effect transistor, the field effect transistor including a gate terminal, a first drain/source terminal, and a second drain/source terminal, the gate terminal being connected to a first wiring to which a reset pulse, which is a pulsing voltage, is applied,
the switch includes a terminal connected to the second drain/source terminal, and another terminal connected to a second wiring from which an output of the field effect transistor is provided,
when the reset pulse applied to the first wiring is applied to the gate terminal while the first electrode is moved towards the field effect transistor, the field effect transistor causes a voltage of the second drain/source terminal to change,
the gate terminal is provided on the second substrate, and
the field effect transistor further includes:
 a gate insulating film provided on the gate terminal,
 a semiconductor layer provided on the gate insulating film such that the first drain/source terminal and the second drain/source terminal are separated from each other on a surface of the semiconductor layer,
 a first metal wiring including a terminal connected to the first drain/source terminal and another terminal connected, in a contact hole defined in the gate insulating film, to the first wiring, and
 a second metal wiring separated from the first metal wiring and including a terminal provided on the second drain/source terminal and another terminal connected to the switch.

2. The display device as set forth in claim 1, wherein:
the first circuit further includes a reset electrode, and a reset transistor for resetting the reset electrode,
the reset electrode and the reset transistor are provided on the second substrate,
the reset transistor has a gate terminal and one of drain/source terminals, each of which gate terminal and the drain/source terminal is connected to the first wiring,
the reset transistor has the other of the drain/source terminals, which is connected to the reset electrode,
the reset electrode is provided between the field effect transistor and the first electrode, and
resetting of the reset electrode is to switch on the reset transistor by applying, to the gate terminal of the reset transistor, the voltage that is applied to the first wiring.

3. The display device as set forth in claim 1, wherein:
the first wiring is provided for each of lines of picture elements including respective ones of the picture element electrodes, to which first wirings the voltage is sequentially applied.

4. The display device as set forth in claim 1, wherein:
on the first electrode is provided a pillar projection including a dielectric, an electric conductor, or a dielectric body covered with an electric conductor, and projecting toward the second substrate from the back channel side of the field effect transistor provided on the first substrate, such that the first substrate is not in contact with the second substrate while no pressure is being applied to the first substrate.

5. The display device as set forth in claim 4, wherein:
the pillar projection has an edge that (i) is separated from the second substrate while no pressure is being applied to the first substrate and (ii) is movable to be in contact with the second substrate in response to a pressure applied to the first substrate.

6. The display device as set forth in claim 1, wherein:
the first circuit is provided in a display region.

7. The display device as set forth in claim 1, wherein:
the second wiring is a data signal line.

8. The display device as set forth in claim 1, wherein:
the second wiring is a wiring other than a data signal line.

9. The display device as set forth in claim 1, comprising:
a liquid crystal layer provided between that region of the first substrate in which the first electrode is provided and that region of the second substrate in which the field effect transistor is provided.

10. The display device as set forth in claim 9, comprising:
a liquid crystal alignment film provided on at least either that region of the first substrate in which the first electrode is provided or that region of the second substrate in which the field effect transistor is provided.

11. The display device as set forth in claim 1, comprising:
a light-shielding film configured to shield the field effect transistor from light.

12. The display device as set forth in claim 1, detecting, on the basis of an output from the first circuit, which output is obtained via the second wiring while the switch is being closed, whether or not the voltage applied to the first wiring is applied to the second wiring via the field effect transistor, so that the display device detects whether or not the first substrate is pressurized.

* * * * *